United States Patent
Crozier et al.

(10) Patent No.: US 12,525,327 B1
(45) Date of Patent: Jan. 13, 2026

(54) METHOD, APPARATUS, AND COMPUTER PROGRAM PRODUCT FOR PROVIDING REAL-TIME PRICING INFORMATION

(71) Applicant: McKesson Corporation, Irving, TX (US)

(72) Inventors: Keith Crozier, North Kingstown, RI (US); Stacy Hopkins, Tucker, GA (US)

(73) Assignee: McKesson Corporation, Irving, TX (US)

( * ) Notice: Subject to any disclaimer, the term of this patent is extended or adjusted under 35 U.S.C. 154(b) by 1009 days.

(21) Appl. No.: 17/501,532

(22) Filed: Oct. 14, 2021

Related U.S. Application Data

(63) Continuation-in-part of application No. 16/453,509, filed on Jun. 26, 2019, now Pat. No. 11,562,437.

(51) Int. Cl.
*G16H 20/10* (2018.01)
*G06Q 30/0201* (2023.01)
*G06Q 30/0601* (2023.01)
*G16H 40/20* (2018.01)

(52) U.S. Cl.
CPC ......... *G16H 20/10* (2018.01); *G06Q 30/0206* (2013.01); *G06Q 30/0629* (2013.01); *G16H 40/20* (2018.01)

(58) Field of Classification Search
CPC ..... G06Q 30/0207; G16H 20/10; G16H 70/40
See application file for complete search history.

(56) References Cited

U.S. PATENT DOCUMENTS

| | | | |
|---|---|---|---|
| 5,012,035 A | 4/1991 | Sartori et al. | |
| 5,173,851 A | 12/1992 | Off et al. | |
| 5,595,342 A | 1/1997 | McNair et al. | |
| 5,628,530 A | 5/1997 | Thornton | |
| 5,726,092 A | 3/1998 | Mathews et al. | |
| 5,757,898 A | 5/1998 | Nishikawa | |

(Continued)

FOREIGN PATENT DOCUMENTS

| | | |
|---|---|---|
| AU | 2003243327 A | 12/2003 |
| CA | 2 482 370 A1 | 3/2006 |

(Continued)

OTHER PUBLICATIONS

United States Patent and Trademark Office, Advisory Action received for U.S. Appl. No. 17/162,461, dated Aug. 24, 2023, 2 pages, US.

(Continued)

*Primary Examiner* — Calvin L Hewitt, II
*Assistant Examiner* — Amanulla Abdullaev
(74) *Attorney, Agent, or Firm* — Alston & Bird LLP

(57) ABSTRACT

A method, apparatus and computer program product are provided for providing real-time pricing information to a patient. A patient may submit a prescription inquiry. In response to the prescription inquiry, a cash price inquiry, a prescription benefit inquiry, and a formulary alternative inquiry are generated by a service provider computer accordingly. The various inquiries may be executed by a service provider computer and/or associated systems. Responses may be further processed, such that cash price information, a patient pay amount under a benefit plan, and formulary alternatives and associated costs are included in a prescription inquiry response for provision to a patient or user.

8 Claims, 3 Drawing Sheets

(56) References Cited

U.S. PATENT DOCUMENTS

| | | |
|---|---|---|
| 5,769,228 A | 6/1998 | Wroblewski |
| 6,012,035 A | 1/2000 | Freeman et al. |
| 6,111,218 A | 8/2000 | Akers et al. |
| 6,463,462 B1 | 10/2002 | Smith et al. |
| 6,595,342 B1 | 7/2003 | Maritzen et al. |
| 6,726,092 B2 | 4/2004 | Goldberg et al. |
| 6,757,898 B1 | 6/2004 | Ilsen et al. |
| 6,769,228 B1 | 8/2004 | Mahar |
| 7,155,397 B2 | 12/2006 | Alexander et al. |
| 7,192,741 B2 | 3/2007 | Otte et al. |
| 7,337,129 B1 | 2/2008 | Lowry et al. |
| 7,346,768 B2 | 3/2008 | DiRienzo |
| 7,409,632 B1 | 8/2008 | DiRienzo |
| 7,426,476 B2 | 9/2008 | Munoz et al. |
| 7,734,483 B1 | 6/2010 | Smith et al. |
| 7,783,383 B2 | 8/2010 | Eliuk et al. |
| 7,840,424 B2 | 11/2010 | Wiley et al. |
| 7,856,364 B1 | 12/2010 | Wiley et al. |
| 7,912,741 B1 | 3/2011 | Pinsonneault |
| 7,921,021 B1 | 4/2011 | Newman |
| 8,036,913 B1 | 10/2011 | Pinsonneault et al. |
| 8,036,914 B1 | 10/2011 | Pinsonneault |
| 8,036,918 B1 | 10/2011 | Pinsonneault |
| 8,050,943 B1 | 11/2011 | Wiley et al. |
| 8,060,379 B1 | 11/2011 | Pinsonneault et al. |
| 8,126,743 B1 | 2/2012 | Wilk |
| 8,326,773 B1 | 12/2012 | Bellamy |
| 8,346,571 B2 | 1/2013 | Kalies, Jr. |
| 8,412,537 B1 | 4/2013 | Fenton et al. |
| 8,442,847 B1 | 5/2013 | Shrivastava |
| 8,489,415 B1 | 7/2013 | Ringold |
| 8,521,557 B1 | 8/2013 | Ringold et al. |
| 8,560,340 B1 | 10/2013 | Ringold |
| 8,639,523 B1 | 1/2014 | Pinsonneault |
| 8,645,162 B2 | 2/2014 | Boerger et al. |
| 8,671,018 B2 | 3/2014 | Thomas et al. |
| 8,712,797 B1 | 4/2014 | Bezdek et al. |
| 8,738,399 B1 | 5/2014 | Abou Nader et al. |
| 8,786,650 B1 | 7/2014 | Eller et al. |
| 8,799,018 B1 | 8/2014 | Rea et al. |
| 8,984,059 B2 | 3/2015 | Johnson |
| 9,026,507 B2 | 5/2015 | Shraim et al. |
| 9,100,793 B2 | 8/2015 | Johnson |
| 9,171,322 B2 | 10/2015 | Spievak et al. |
| 9,356,947 B2 | 5/2016 | Shraim et al. |
| 9,760,871 B1 | 9/2017 | Pourfallah et al. |
| 9,779,129 B1 | 10/2017 | Lequeux |
| 9,786,023 B2 | 10/2017 | Cohan et al. |
| 10,109,027 B1 | 10/2018 | Stack |
| 10,157,262 B1 | 12/2018 | Pinsonneault |
| 10,262,383 B1 | 4/2019 | Harris, Sr. et al. |
| 10,331,855 B1 | 6/2019 | Bratton et al. |
| 10,417,380 B1 | 9/2019 | Kaye et al. |
| 10,489,552 B2 | 11/2019 | Pinsonneault |
| 10,496,793 B1 | 12/2019 | Lawrence et al. |
| 10,565,656 B1 | 2/2020 | Pinsonneault et al. |
| 10,606,984 B1 | 3/2020 | Kaye et al. |
| 10,616,146 B1 | 4/2020 | Hopkins et al. |
| 10,628,797 B2 | 4/2020 | Shraim et al. |
| 10,642,812 B1 | 5/2020 | Hopkins et al. |
| 10,713,694 B1 | 7/2020 | Harris et al. |
| 10,747,848 B2 | 8/2020 | Guinan |
| 10,778,618 B2 | 9/2020 | Karnin et al. |
| 10,862,832 B1 | 12/2020 | Harris |
| 10,924,545 B2 | 2/2021 | Momchilov et al. |
| 10,924,585 B1 | 2/2021 | Harris et al. |
| 10,929,932 B1 | 2/2021 | Golden et al. |
| 10,978,198 B1 | 4/2021 | Pinsonneault |
| 10,999,224 B1 | 5/2021 | Frechen et al. |
| 11,043,293 B1 | 6/2021 | Salzbrenner |
| 11,170,394 B1 | 11/2021 | Macinski |
| 11,443,835 B1 * | 9/2022 | Gangaikondan-Iyer .................... G16H 10/00 |
| 11,508,471 B1 | 11/2022 | Anselmi et al. |
| 11,640,618 B1 | 5/2023 | Burdine |
| 2001/0029483 A1 | 10/2001 | Schultz et al. |
| 2001/0034613 A1 | 10/2001 | Rubsamen |
| 2001/0037216 A1 | 11/2001 | Oscar et al. |
| 2001/0039589 A1 | 11/2001 | Aho et al. |
| 2001/0056359 A1 | 12/2001 | Abreu |
| 2002/0002495 A1 | 1/2002 | Ullman |
| 2002/0004812 A1 | 1/2002 | Motoyama |
| 2002/0032582 A1 | 3/2002 | Feeney et al. |
| 2002/0032583 A1 | 3/2002 | Joao |
| 2002/0035484 A1 | 3/2002 | McCormick |
| 2002/0087583 A1 | 7/2002 | Morgan et al. |
| 2002/0111832 A1 | 8/2002 | Judge |
| 2002/0133379 A1 | 9/2002 | Lewis et al. |
| 2002/0143579 A1 | 10/2002 | Docherty et al. |
| 2002/0147614 A1 | 10/2002 | Doerr et al. |
| 2002/0188552 A1 | 12/2002 | Kavounas et al. |
| 2002/0198831 A1 | 12/2002 | Patricelli et al. |
| 2003/0009367 A1 | 1/2003 | Morrison |
| 2003/0050796 A1 | 3/2003 | Baldwin |
| 2003/0050799 A1 | 3/2003 | Jay et al. |
| 2003/0069760 A1 | 4/2003 | Gelber |
| 2003/0074234 A1 | 4/2003 | Stasny |
| 2003/0097310 A1 | 5/2003 | Ono et al. |
| 2003/0130875 A1 | 7/2003 | Hawash et al. |
| 2003/0149625 A1 | 8/2003 | Leonardi et al. |
| 2003/0154163 A1 | 8/2003 | Phillips et al. |
| 2003/0172008 A1 | 9/2003 | Hage et al. |
| 2003/0187690 A1 | 10/2003 | Miller |
| 2003/0229540 A1 | 12/2003 | Algiene |
| 2003/0236747 A1 | 12/2003 | Sager |
| 2004/0006490 A1 | 1/2004 | Gingrich et al. |
| 2004/0039599 A1 | 2/2004 | Fralic |
| 2004/0054685 A1 | 3/2004 | Rahn et al. |
| 2004/0059607 A1 | 3/2004 | Ball et al. |
| 2004/0073456 A1 | 4/2004 | Gottlieb et al. |
| 2004/0073457 A1 | 4/2004 | Kalies |
| 2004/0078222 A1 | 4/2004 | Khan et al. |
| 2004/0078234 A1 | 4/2004 | Tallal, Jr. |
| 2004/0088187 A1 | 5/2004 | Chudy et al. |
| 2004/0103062 A1 | 5/2004 | Wood et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0199545 A1 | 10/2004 | Wagner et al. |
| 2004/0236630 A1 | 11/2004 | Kost et al. |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0065821 A1 | 3/2005 | Kalies, Jr. |
| 2005/0075932 A1 | 4/2005 | Mankoff |
| 2005/0080692 A1 | 4/2005 | Padam et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240442 A1 | 10/2005 | Lapsker et al. |
| 2005/0240473 A1 | 10/2005 | Ayers, Jr. et al. |
| 2005/0261939 A1 | 11/2005 | Augspurger et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0036470 A1 | 2/2006 | Oaks |
| 2006/0085231 A1 | 4/2006 | Brofman |
| 2006/0085385 A1 | 4/2006 | Foster et al. |
| 2006/0113376 A1 | 6/2006 | Reed et al. |
| 2006/0149595 A1 | 7/2006 | Williams et al. |
| 2006/0149784 A1 | 7/2006 | Tholl et al. |
| 2006/0155578 A1 | 7/2006 | Eisenberger et al. |
| 2006/0184391 A1 | 8/2006 | Barre et al. |
| 2006/0212318 A1 | 9/2006 | Dooley |
| 2006/0212345 A1 | 9/2006 | Soza et al. |
| 2006/0224414 A1 | 10/2006 | Astrup et al. |
| 2006/0224417 A1 | 10/2006 | Werner |
| 2006/0224443 A1 | 10/2006 | Soza et al. |
| 2006/0235747 A1 | 10/2006 | Hammond et al. |
| 2006/0259363 A1 | 11/2006 | Jhetam et al. |
| 2007/0005402 A1 | 1/2007 | Kennedy et al. |
| 2007/0033137 A1 | 2/2007 | Provost et al. |
| 2007/0043589 A1 | 2/2007 | Warren et al. |

(56) References Cited

U.S. PATENT DOCUMENTS

| | | |
|---|---|---|
| 2007/0043595 A1* | 2/2007 | Pederson .............. G06Q 10/10 705/2 |
| 2007/0050209 A1 | 3/2007 | Yered |
| 2007/0050210 A1 | 3/2007 | Wiley, II |
| 2007/0067186 A1 | 3/2007 | Brenner et al. |
| 2007/0094133 A1 | 4/2007 | Anandarao et al. |
| 2007/0108053 A1 | 5/2007 | Cramer et al. |
| 2007/0136100 A1 | 6/2007 | Daugherty et al. |
| 2007/0162303 A1 | 7/2007 | Wiley et al. |
| 2007/0168228 A1 | 7/2007 | Lawless |
| 2007/0185799 A1 | 8/2007 | Harrison et al. |
| 2007/0191985 A1 | 8/2007 | Bain |
| 2007/0194352 A1 | 8/2007 | Han |
| 2007/0202886 A1 | 8/2007 | Dhebri et al. |
| 2007/0204043 A1 | 8/2007 | Espinosa et al. |
| 2007/0219813 A1 | 9/2007 | Moore |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0250341 A1 | 10/2007 | Howe et al. |
| 2007/0260750 A1 | 11/2007 | Feied et al. |
| 2007/0276697 A1 | 11/2007 | Wiley et al. |
| 2007/0294765 A1 | 12/2007 | Rihn et al. |
| 2007/0299915 A1 | 12/2007 | Shraim et al. |
| 2008/0033750 A1 | 2/2008 | Swiss et al. |
| 2008/0103836 A1 | 5/2008 | Park et al. |
| 2008/0112411 A1 | 5/2008 | Stafford et al. |
| 2008/0152107 A1 | 6/2008 | Mendiola |
| 2008/0183492 A1 | 7/2008 | Warren et al. |
| 2008/0215361 A1 | 9/2008 | Nunnari et al. |
| 2008/0262948 A1 | 10/2008 | Grady et al. |
| 2009/0006141 A1 | 1/2009 | Karr |
| 2009/0030719 A1 | 1/2009 | Nadas et al. |
| 2009/0064330 A1 | 3/2009 | Shraim et al. |
| 2009/0083064 A1 | 3/2009 | Mahinda |
| 2009/0094051 A1 | 4/2009 | Ard et al. |
| 2009/0100099 A1 | 4/2009 | Buckwalter |
| 2009/0106313 A1 | 4/2009 | Boldyga |
| 2009/0112707 A1 | 4/2009 | Weiss et al. |
| 2009/0198510 A1 | 8/2009 | Ditto |
| 2009/0204477 A1 | 8/2009 | Urso |
| 2009/0287558 A1 | 11/2009 | Seth et al. |
| 2009/0313112 A1 | 12/2009 | Champ et al. |
| 2009/0327363 A1 | 12/2009 | Cullen et al. |
| 2010/0030667 A1 | 2/2010 | Chudy et al. |
| 2010/0057640 A1 | 3/2010 | Cannata |
| 2010/0070298 A1 | 3/2010 | Kalies |
| 2010/0144259 A1 | 6/2010 | Allexon et al. |
| 2010/0145730 A1 | 6/2010 | Abreu |
| 2010/0161353 A1 | 6/2010 | Mayaud |
| 2010/0217622 A1 | 8/2010 | Brown et al. |
| 2010/0249045 A1 | 9/2010 | Babul |
| 2010/0285821 A1 | 11/2010 | Smeeding et al. |
| 2010/0287001 A1 | 11/2010 | Pearce et al. |
| 2010/0293236 A1 | 11/2010 | Wisner et al. |
| 2011/0015978 A1 | 1/2011 | Welch, Jr. |
| 2011/0112871 A1 | 5/2011 | Simonowski et al. |
| 2011/0161109 A1 | 6/2011 | Pinsonneault et al. |
| 2011/0196697 A1 | 8/2011 | Akers |
| 2011/0288886 A1 | 11/2011 | Whiddon et al. |
| 2011/0288925 A1 | 11/2011 | Thomas et al. |
| 2012/0053958 A1 | 3/2012 | Marshall et al. |
| 2012/0109839 A1 | 5/2012 | Anderson et al. |
| 2012/0136809 A1 | 5/2012 | Cannata et al. |
| 2012/0143627 A1 | 6/2012 | Ruben et al. |
| 2012/0166268 A1 | 6/2012 | Griffiths |
| 2012/0179481 A1 | 7/2012 | Patel et al. |
| 2012/0185263 A1 | 7/2012 | Emert |
| 2012/0185264 A1 | 7/2012 | Demogenes et al. |
| 2012/0253829 A1 | 10/2012 | John et al. |
| 2012/0253830 A1 | 10/2012 | John et al. |
| 2012/0253831 A1 | 10/2012 | John et al. |
| 2012/0253832 A1 | 10/2012 | John et al. |
| 2012/0253833 A1 | 10/2012 | John et al. |
| 2012/0253846 A1* | 10/2012 | John ..................... G16H 40/67 705/2 |
| 2012/0265591 A1 | 10/2012 | Hwang |
| 2012/0303382 A1 | 11/2012 | Paul et al. |
| 2012/0323608 A1 | 12/2012 | Herzlinger |
| 2013/0041968 A1 | 2/2013 | Cohen et al. |
| 2013/0046610 A1 | 2/2013 | Abraham |
| 2013/0103602 A1 | 4/2013 | Melnick et al. |
| 2013/0144715 A1 | 6/2013 | Kranzley et al. |
| 2013/0179180 A1 | 7/2013 | Patra |
| 2013/0191147 A1 | 7/2013 | Harrell |
| 2013/0197980 A1 | 8/2013 | Lerner et al. |
| 2013/0246082 A1 | 9/2013 | Brylawski et al. |
| 2013/0311389 A1 | 11/2013 | Kaehler et al. |
| 2014/0039911 A1* | 2/2014 | Iyer ................... G06Q 30/0207 705/2 |
| 2014/0088985 A1 | 3/2014 | Grant et al. |
| 2014/0214435 A1 | 7/2014 | Previdi |
| 2014/0249861 A1 | 9/2014 | Gamble et al. |
| 2014/0249864 A1 | 9/2014 | Sultan et al. |
| 2014/0278448 A1 | 9/2014 | Sadeghi et al. |
| 2014/0278456 A1 | 9/2014 | Milosevich et al. |
| 2014/0278531 A1 | 9/2014 | Gupta |
| 2015/0032465 A1 | 1/2015 | Sundar et al. |
| 2015/0088557 A1 | 3/2015 | Huynh et al. |
| 2015/0142479 A1 | 5/2015 | Porter et al. |
| 2015/0149197 A1 | 5/2015 | Guinan |
| 2015/0154565 A1 | 6/2015 | Kaehler et al. |
| 2015/0154588 A1 | 6/2015 | Purves et al. |
| 2015/0195224 A1 | 7/2015 | Karnin et al. |
| 2015/0213195 A1 | 7/2015 | Blechman |
| 2015/0234991 A1 | 8/2015 | Pinsonneault |
| 2015/0235177 A1 | 8/2015 | Shraim et al. |
| 2015/0269695 A1 | 9/2015 | Pinsonneault et al. |
| 2015/0278472 A1 | 10/2015 | King |
| 2015/0332422 A1 | 11/2015 | Gilmartin |
| 2015/0356255 A1 | 12/2015 | Simpson et al. |
| 2015/0371000 A1* | 12/2015 | Pinsonneault ......... G16H 10/60 705/2 |
| 2016/0012465 A1 | 1/2016 | Sharp |
| 2016/0103978 A1* | 4/2016 | Stong .................... G16H 70/40 705/3 |
| 2016/0140593 A1 | 5/2016 | Smeeding et al. |
| 2016/0213512 A1 | 7/2016 | Palanker et al. |
| 2016/0267544 A1 | 9/2016 | Flood et al. |
| 2016/0267545 A1 | 9/2016 | Glass et al. |
| 2016/0307195 A1 | 10/2016 | Cantwell et al. |
| 2016/0321406 A1 | 11/2016 | Timmerman et al. |
| 2016/0321410 A1 | 11/2016 | Timmerman et al. |
| 2016/0358142 A1 | 12/2016 | Hillen |
| 2016/0358293 A1 | 12/2016 | Berger et al. |
| 2016/0359795 A1 | 12/2016 | Fehling |
| 2017/0034087 A1 | 2/2017 | Borenstein et al. |
| 2017/0039331 A1 | 2/2017 | Bezdek et al. |
| 2017/0220768 A1 | 8/2017 | Tanner, Jr. et al. |
| 2017/0255759 A1 | 9/2017 | McGrath |
| 2017/0323295 A1 | 11/2017 | Kranzley et al. |
| 2017/0324695 A1 | 11/2017 | Fischer et al. |
| 2017/0329922 A1 | 11/2017 | Eberting et al. |
| 2018/0012244 A1 | 1/2018 | Leonardi |
| 2018/0075212 A1 | 3/2018 | Kubey |
| 2018/0075215 A1 | 3/2018 | Loiacoono |
| 2018/0366810 A1 | 12/2018 | Nero et al. |
| 2019/0095582 A1 | 3/2019 | Waits |
| 2019/0213212 A1 | 7/2019 | Adato et al. |
| 2019/0252049 A1 | 8/2019 | Fotsch et al. |
| 2019/0348160 A1 | 11/2019 | Heavelyn |
| 2019/0371444 A1 | 12/2019 | Glass et al. |
| 2019/0385733 A1 | 12/2019 | Kaye et al. |
| 2019/0385734 A1 | 12/2019 | Pinsonneault |
| 2020/0105392 A1 | 4/2020 | Karkazis et al. |
| 2020/0143946 A1 | 5/2020 | Lewis |
| 2020/0242626 A1 | 7/2020 | Agarwal |
| 2020/0372988 A1 | 11/2020 | Bezdek et al. |
| 2020/0395114 A1 | 12/2020 | Bachwani |
| 2021/0217044 A1 | 7/2021 | Sigsbee |
| 2021/0287774 A1 | 9/2021 | Curtiss et al. |
| 2021/0319887 A1 | 10/2021 | Derrick, Jr. et al. |

(56) References Cited

U.S. PATENT DOCUMENTS

| | | | |
|---|---|---|---|
| 2021/0374872 | A1 | 12/2021 | Stewart et al. |
| 2021/0374876 | A1 | 12/2021 | Cedergreen |
| 2021/0407642 | A1 | 12/2021 | Xia et al. |

FOREIGN PATENT DOCUMENTS

| | | | |
|---|---|---|---|
| CA | 2792252 | A1 | 4/2013 |
| CA | 2810686 | A1 | 10/2013 |
| CN | 102362778 | | 2/2012 |
| KR | 100755440 | | 9/2007 |
| KR | 100793852 | | 1/2008 |
| KR | 101038074 | | 6/2011 |
| KR | 101101692 | | 12/2011 |
| KR | 20110138108 | | 12/2011 |
| KR | 20110138572 | | 12/2011 |
| KR | 101154858 | | 6/2012 |
| WO | WO 1991/006917 | A1 | 5/1991 |
| WO | WO 1995/003569 | A2 | 2/1995 |
| WO | WO 1997/025682 | A1 | 7/1997 |
| WO | WO 1998/050871 | A1 | 11/1998 |
| WO | WO 2000/039737 | A1 | 7/2000 |
| WO | WO 2003/098401 | A2 | 11/2003 |
| WO | WO 2007/025295 | A2 | 3/2007 |
| WO | WO 2007/094772 | A1 | 8/2007 |
| WO | WO 2008/092109 | A2 | 7/2008 |

OTHER PUBLICATIONS

American Hospital Association, "Drug Price Proposals", dated Apr. 2019, retrieved from the Internet at <URL: https://www.aha.org/system/files/media/file/2019/04/aha-drug-policy-recommendations_2.pdf>, 8 pages.

California Health Care Foundation, "When the Price Is Not Right: State Options on Prescription Drug Pricing", dated Jun. 2016, retrieved from the Internet at: <URL: https://www.chcf.org/wp-content/uploads/2017/12/PDF-WhenStateRxPricing.pdf>, 16 pages.

Hsee, Christopher K., et al., "General Evaluability Theory", Perspectives on Psychological Science, Jul. 2010, pp. 343-355, vol. 5, No. 4, Sage Publications, Inc. on behalf of the Association for Psychological Science retrieved from the Internet at <URL: https://www.jstor.org/stable/41613442>.

United States Patent and Trademark Office, Advisory Action received for U.S. Appl. No. 16/867,286, dated Dec. 6, 2022, 8 pages, US.

United States Patent and Trademark Office, Advisory Action received for U.S. Appl. No. 17/175,939, dated Dec. 22, 2022, 5 pages, US.

United States Patent and Trademark Office, Final Office Action received for U.S. Appl. No. 17/144,426, dated Dec. 8, 2022, 21 pages, US.

United States Patent and Trademark Office, Notice of Allowance received for U.S. Appl. No. 16/832,318, dated Dec. 8, 2022, 26 pages, US.

Van Nuys, Ph.D., Karen, et al., "Prescription Drug Copayment Coupon Landscape", Drug Pricing White Paper, USC Leonard D. Schaeffer Center for Health Policy and Economics, Feb. 7, 2018, retrieved from the Internet at <URL: https://healthpolicy.usc.edu/research/prescription-drug-copayment-coupon-landscape/>, 21 pages.

United States Patent and Trademark Office, Advisory Action received for U.S. Appl. No. 17/144,426, dated Mar. 21, 2024, 5 pages.

United States Patent and Trademark Office, Advisory Action received for U.S. Appl. No. 17/674,366, dated Mar. 22, 2024, 6 pages.

United States Patent and Trademark Office, Final Office Action received for U.S. Appl. No. 17/705,919, dated Feb. 28, 2024, 61 pages.

United States Patent and Trademark Office, Final Office Action received for U.S. Appl. No. 17/175,939, dated Mar. 1, 2024, 24 pages.

United States Patent and Trademark Office, Advisory Action received for U.S. Appl. No. 16/816,460, dated Aug. 1, 2024, 3 pages, U.S.

United States Patent and Trademark Office, Advisory Action received for U.S. Appl. No. 17/162,461, dated Aug. 19, 2024, 2 pages, U.S.

United States Patent and Trademark Office, Non-Final Office Action received for U.S. Appl. No. 18/098,150, dated Aug. 27, 2024, 61 pages, U.S.

United States Patent and Trademark Office, Interview Summary received for U.S. Appl. No. 17/675,616, dated Aug. 15, 2024, 8 pages, U.S.

United States Patent and Trademark Office, Advisory Action received for U.S. Appl. No. 16/832,318, dated Jan. 28, 2022, 4 pages, U.S.

United States Patent and Trademark Office, Non-Final Office Action received for U.S. Appl. No. 16/867,286, dated Feb. 22, 2022, 38 pages, U.S.

United States Patent and Trademark Office, Notice of Allowance received for U.S. Appl. No. 17/219,526, dated Feb. 3, 2022, 48 pages, U.S.

Zhu, V. et al., "Data for drugs available through low-cost prescription drug programs are available through pharmacy benefit manager and claims data," BMC Clinical Pharmacology, Jun. 22, 2012, vol. 12, No. 12., BioMed Central Ltd., UK.

Coase, R. H., "The Nature of the Firm", Economica, Nov. 1937, pp. 386-405, vol. 4, No. 16, Blackwell Publishing for London School of Economics and Political Science, retrieved from the Internet at http://www.jstor.org/stable/2626876 on Nov. 7, 2011.

Gemmill, Marin, "The price elasticity of demand for prescription drugs: An exploration of demand in different settings", Doctor of Philosophy Thesis submitted to the London School of Economics and Political Science, Jan. 2008, 380 pages, UMI No. U615895, UMI Dissertation Publishing, ProQuest LLC, US.

United States Patent and Trademark Office, Advisory Action and Examiner-Initiated Interview Summary received for U.S. Appl. No. 17/705,919, dated Jun. 25, 2024, 33 pages, US.

United States Patent and Trademark Office, Examiner's Answer received for U.S. Appl. No. 16/867,286, dated Jun. 28, 2024, 9 pages, US.

United States Patent and Trademark Office, Non-Final Office Action received for U.S. Appl. No. 17/144,426, dated Jul. 18, 2024, 19 pages, US.

United States Patent and Trademark Office, Non-Final Office Action received for U.S. Appl. No. 17/158,118, dated Jul. 18, 2024, 22 pages, US.

United States Patent and Trademark Office, Notice of Allowance received for U.S. Appl. No. 17/846,373, dated Jul. 25, 2024, 16 pages, US.

U.S. Appl. No. 16/816,460, "Adaptive System and Method for Adjudicating Claims to Reduce Member Responsibility", Unpublished (Filing Date Mar. 12, 2020), (Michael Rea, Inventor), (RC Savings, LLC, Assignee).

United States Patent and Trademark Office, Non-Final Office Action received for U.S. Appl. No. 16/816,460, dated Mar. 3, 2023, 14 pages, U.S.

United States Patent and Trademark Office, Final Office Action received for U.S. Appl. No. 17/162,461, dated May 19, 2023, 23 pages, U.S.

United States Patent and Trademark Office, Advisory Action received for U.S. Appl. No. 17/158,118, dated May 26, 2023, 5 pages, U.S.

United States Patent and Trademark Office, Non-Final Office Action received for U.S. Appl. No. 17/674,366, dated Jun. 6, 2023, 75 pages, U.S.

United States Patent and Trademark Office, Miscellaneous Office Action, Restarting Period, received for U.S. Appl. No. 17/175,939, dated Jun. 14, 2023, 23 pages, U.S.

Viswanthan, Meera, et al., "Interventions to Improve Adherence to Self-administered Medications for Chronic Diseases in the United States," Annals of Internal Medicine, Dec. 4, 2012, retrieved from the Internet at <https://www.acpjournals.org/doi/full/10.7326/0003-4819-157-11-201212040-00538?rfr_dat=cr_pub++0pubmed&url_ver=Z39.88-2003&rfr_id=ori%3Arid%3Acrossref.org> on Jun. 14, 2023, 25 pages.

United States Patent and Trademark Office, Final Office Action received for U.S. Appl. No. 16/816,460, dated Aug. 10, 2023, 14 pages, U.S.

United States Patent and Trademark Office, Non-Final Office Action received for U.S. Appl. No. 17/144,426, dated Jul. 13, 2023, 17 pages, U.S.

(56) References Cited

OTHER PUBLICATIONS

United States Patent and Trademark Office, Non-Final Office Action received for U.S. Appl. No. 17/158,118, dated Jul. 13, 2023, 18 pages, U.S.

United States Patent and Trademark Office, Final Office Action received for U.S. Appl. No. 16/867,286, dated Sep. 19, 2023, 16 pages, US.

United States Patent and Trademark Office, Advisory Action received for U.S. Appl. No. 16/816,460, dated Oct. 19, 2023, 3 pages, US.

United States Patent and Trademark Office, Non-Final Office Action received for U.S. Appl. No. 17/162,461, dated Oct. 19, 2023, 25 pages, US.

United States Patent and Trademark Office, Non-Final Office Action received for U.S. Appl. No. 17/705,919, dated Aug. 17, 2023, 68 pages, US.

Google NPL (non-patent literature) Search on "pharmacy payment benefit copay NDC database", retrieved from the Internet at <https://scholar.google.com/scholar?hl=en&as_sdt=3,47&g=pharmacy+payment+benefit+copay+NDC+database> on Feb. 20, 2022 at 3:02 pm, 1 page.

Google NPL (non-patent literature) Search on "pharmacy payment benefit copay NDC database", retrieved from the Internet at <https://www.google.com/search?g=pharmacy+payment+benefit+copay+ndc+database&source=int&tbs=cdr%3A1%2Ccd_min%3A1%2F1%2F2010%2 . . . > on Feb. 20, 2022 at 3:00 pm, 2 pages.

United States Patent and Trademark Office, Advisory Action received for U.S. Appl. No. 16/792,413, dated Mar. 10, 2022, 4 pages, US.

United States Patent and Trademark Office, Notice of Allowance and Fee(s) Due received for U.S. Appl. No. 17/219,526, dated Mar. 22, 2022, 11 pages, US.

United States Patent and Trademark Office, Notice of Allowance and Fee(s) Due received for U.S. Appl. No. 16/551,962, dated Mar. 16, 2022, 10 pages, US.

United States Patent and Trademark Office, Notice of Allowance and Fee(s) Due received for U.S. Appl. No. 17/092,705, dated Mar. 24, 2022, 9 pages, US.

United States Patent and Trademark Office, Notice of Allowance and Fee(s) Due received for U.S. Appl. No. 16/551,962, dated Mar. 1, 2022, 14 pages, US.

United States Patent and Trademark Office, Non-Final Office Action received for U.S. Appl. No. 17/674,366, dated Jun. 5, 2024, 54 pages, US.

United States Patent and Trademark Office, Final Office Action received for U.S. Appl. No. 17/162,461, dated Jun. 4, 2024, 38 pages, US.

United States Patent and Trademark Office, Non-Final Office Action received for U.S. Appl. No. 16/867,286, dated Mar. 31, 2023, 16 pages, US.

United States Patent and Trademark Office, Non-Final Office Action received for U.S. Appl. No. 17/175,939, dated Apr. 26, 2023, 24 pages, US.

United States Patent and Trademark Office, Notice of Allowance received for U.S. Appl. No. 15/085,166, dated Jun. 15, 2022, 18 pages, U.S.

United States Patent and Trademark Office, Final Office Action received for U.S. Appl. No. 17/012,565, dated Jul. 25, 2022, 43 pages, U.S.

Pharmacy Reject Codes NCPDP, 5 pages.

St. Vincent's first to use Birmingham startup's information system. The Birmingham News [Online] Apr. 11, 2005. URL: http://www.awarix.com.

St. Vincent's is Digital Flagship D. Lockridge; Birmingham Medical News [Online] Sep. 2005.

Two automatic identification technology, neither new in the sense if being recent developments . . . Patient Safety & Quality Healthcare [Online] Aug. 2005_ URL: http://www_awarix.com.

Advisory Action for U.S. Appl. No. 14/193,294 mailed Nov. 9, 2017, 3 pages.

Advisory Action for U.S. Appl. No. 15/085,166 dated Apr. 11, 2019, 4 pages.

Advisory Action for U.S. Appl. No. 15/085,166 dated Apr. 29, 2020, 3 pages.

Advisory Action for U.S. Appl. No. 15/137,371 mailed Feb. 25, 2019, 5 pages.

Advisory Action for U.S. Appl. No. 15/427,746 mailed Jul. 2, 2019, 2 pages.

Advisory Action received for U.S. Appl. No. 15/085,166, dated Jan. 29, 2021, 3 pages, US.

Almaro, Moshe; "Recovery and Reuse of Unused Prescription Drugs" MIT What Matters: Aug. 2005.

American Society of Health-System Pharmacists (ASHP), "Is Prescribing the Next Step in the Evolution of Pharmacy?" May 15, 2012.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Anonymous, Medic; On-line Goes In-House, Chain Store Age Executive, Jan. 1987, vol. 63, Issue 1, USA; Abstract only.

Anonymous, Pharmacy Industry Leaders Launch Firm to Supply Real-Time Data, PR Newswire, Jul. 30, 2001, p. 1, New York, NY, USA.

Anonymous, TechRx Announces Successful Beta Deployment of T-Rex. PR Newswire. May 13, 2002.

CMS Updates Drug Dashboards with Prescription Drug Pricing and Spending Data, Data, Medicare Part D, Prescription drugs (Mar. 14, 2019).

Consalvo, Bob; "City of Boston in the City Council" hearing notice, Dec. 6, 2006.

Coping with Information Overload. The News Source for Healthcare Information Technology [Online] Nov. 2004. URL: http://www.awarix.com.

Decision to Grant European Patent Application No. 13809457.8 dated May 18, 2017.

Examiner's Answer for U.S. Appl. No. 14/145,027 mailed Sep. 7, 2016, 27 pages.

Extended European Search Report for European Application No. 13809457.8 dated Apr. 15, 2016, 6 pages.

Final Office Action for U.S. Appl. No. 12/140,015 mailed Jan. 31, 2011, 10 pages.

Final Office Action for U.S. Appl. No. 12/415,062 mailed Oct. 6, 2011, 18 pages.

Final Office Action for U.S. Appl. No. 12/555,589 mailed Apr. 11, 2012, 17 pages.

Final Office Action for U.S. Appl. No. 12/560,071 mailed Aug. 28, 2015, 8 pages.

Final Office Action for U.S. Appl. No. 12/560,071 mailed Nov. 8, 2012, 11 pages.

Final Office Action for U.S. Appl. No. 12/570,982 mailed Apr. 11, 2014, 22 pages.

Final Office Action for U.S. Appl. No. 12/570,982 mailed Aug. 28, 2015, 10 pages.

Final Office Action for U.S. Appl. No. 12/570,982 mailed Jan. 17, 2013, 19 pages.

Final Office Action for U.S. Appl. No. 12/730,015 mailed Aug. 14, 2012, 10 pages.

Final Office Action for U.S. Appl. No. 12/978,898 mailed May 16, 2013, 16 pages.

Final Office Action for U.S. Appl. No. 13/721,890 mailed Jun. 24, 2015, 14 pages.

Final Office Action for U.S. Appl. No. 13/721,890 mailed Nov. 25, 2016, 12 pages.

Final Office Action for U.S. Appl. No. 13/782,909 mailed May 31, 2016, 18 pages.

Final Office Action for U.S. Appl. No. 13/782,909 mailed Oct. 6, 2015, 24 pages.

Final Office Action for U.S. Appl. No. 13/804,175 mailed Oct. 6, 2015, 6 pages.

Final Office Action for U.S. Appl. No. 13/827,676 mailed Jul. 13, 2015, 17 pages.

Final Office Action for U.S. Appl. No. 14/090,113 mailed Jan. 6, 2016, 18 pages.

(56) References Cited

OTHER PUBLICATIONS

Final Office Action for U.S. Appl. No. 14/090,122 mailed Apr. 22, 2016, 13 pages.
Final Office Action for U.S. Appl. No. 14/145,027 mailed Nov. 19, 2015, 12 pages.
Final Office Action for U.S. Appl. No. 14/193,294 mailed May 2, 2016, 29 pages.
Final Office Action for U.S. Appl. No. 14/218,326 mailed Jun. 30, 2016, 17 pages.
Final Office Action for U.S. Appl. No. 15/085,166, dated Dec. 4, 2020, 11 pages.
Final Office Action for U.S. Appl. No. 15/137,371 mailed Nov. 28, 2018, 24 pages.
Final Office Action for U.S. Appl. No. 15/427,746 mailed Apr. 15, 2019, 9 pages.
How to Estimate the Cost of a Prescription. Pam Olson, Sr. Client Services Executive, Navitus Health Solutions (Year: 2015).
Kaplan et al., "Let the Needles Do the Talking! Evaluating the New Haven Needle Exchange." Interfaces 23:1, Jan.-Feb. 1993 (pp. 7-26).
Lamb, J., New Era of Electronic Medicine Management: E-Prescriptions, Britain's Traditionally Cautious National Health Service is Starting Trials for Online Prescription, with the Aim of Cutting Costs, Finance Times, London, Feb. 21, 2001, p. 6, London, United Kingdom.
Letter Restarting Period for Response for U.S. Appl. No. 13/721,890 mailed Jan. 14, 2015, 11 pages.
Marie Chisholm et al. "Pharmaceutical Manufacturer Assistance Program." Arch Intern Med. vol. 162, Apr. 8, 2002.
Non-Final Office Action for U.S. Appl. No. 12/560,071 mailed Jun. 21, 2012, 11 pages.
Non-Final Office Action for U.S. Appl. No. 12/570,982 mailed Jun. 20, 2012, 10 pages.
Non-Final Office Action for U.S. Appl. No. 14/193,294 mailed Feb. 21, 2017, 32 pages.
Non-Final Office Action for U.S. Appl. No. 15/085,166 dated Jun. 12, 2020, 26 pages.
Non-Final Office Action for U.S. Appl. No. 16/180,915 dated Jun. 1, 2020, 40 pages.
Non-final Office Action for U.S. Appl. No. 12/140,015 mailed Oct. 8, 2010, 9 pages.
Non-final Office Action for U.S. Appl. No. 12/189,650 mailed Jan. 22, 2010, 11 pages.
Non-final Office Action for U.S. Appl. No. 12/189,654 mailed Jan. 22, 2010, 11 pages.
Non-Final Office Action for U.S. Appl. No. 12/388,956 mailed Feb. 3, 2011, 11 pages.
Non-Final Office Action for U.S. Appl. No. 12/415,062 mailed Mar. 30, 2011, 23 pages.
Non-Final Office Action for U.S. Appl. No. 12/555,589 mailed Dec. 9, 2011, 12 pages.
Non-Final Office Action for U.S. Appl. No. 12/560,071 mailed Sep. 23, 2014, 17 pages.
Non-Final Office Action for U.S. Appl. No. 12/570,982 mailed Sep. 12, 2013, 22 pages.
Non-Final Office Action for U.S. Appl. No. 12/730,015 mailed Mar. 6, 2012, 9 pages.
Non-Final Office Action for U.S. Appl. No. 12/956,411 mailed Jan. 24, 2011, 9 pages.
Non-Final Office Action for U.S. Appl. No. 12/978,898 mailed Feb. 6, 2013, 12 pages.
Non-Final Office Action for U.S. Appl. No. 12/982,395 mailed Dec. 11, 2012, 13 pages.
Non-Final Office Action for U.S. Appl. No. 13/721,890 mailed Jan. 9, 2015, 11 pages.
Non-Final Office Action for U.S. Appl. No. 13/721,890 mailed Jun. 14, 2016, 9 pages.
Non-final Office Action for U.S. Appl. No. 13/782,909 mailed Feb. 11, 2016, 17 pages.
Non-Final Office Action for U.S. Appl. No. 13/827,676 mailed Dec. 26, 2014, 13 pages.
Non-final Office Action for U.S. Appl. No. 13/827,676 mailed Dec. 30, 2015, 23 pages.
Non-Final Office Action for U.S. Appl. No. 14/145,027 mailed Mar. 23, 2015, 13 pages.
Non-Final Office Action for U.S. Appl. No. 15/137,371 mailed May 29, 2018, 19 pages.
Non-Final Office Action for U.S. Appl. No. 15/427,746 mailed Oct. 18, 2018, 9 pages.
Non-Final Office Action for U.S. Appl. No. 16/819,258 dated Sep. 4, 2020, 6 pages.
Non-Final Office Action received for U.S. Appl. No. 15/085,166, dated Mar. 17, 2021, 11 pages.
Non-Final Office Action received for U.S. Appl. No. 16/551,962, dated Mar. 2, 2021, 16 pages.
Non-Final Office Action received for U.S. Appl. No. 16/453,509 mailed Mar. 26, 2021, 45 pages.
Non-Final Office Action received for U.S. Appl. No. 16/832,318 mailed Apr. 23, 2021, 52 pages.
Notice of Allowance and Fees(s) Due for U.S. Appl. No. 15/925,011 dated Jan. 22, 2021, 15 pages.
Notice of Allowance for U.S. Appl. No. 16/180,915 dated Dec. 11, 2020, 23 pages.
Notice of Allowance for U.S. Appl. No. 11/674,069 mailed Jul. 19, 2010, 13 pages.
Notice of Allowance for U.S. Appl. No. 12/140,015 mailed Jun. 10, 2011, 10 pages.
Notice of Allowance for U.S. Appl. No. 12/165,221 mailed Nov. 16, 2010, 6 pages.
Notice of Allowance for U.S. Appl. No. 12/189,650 mailed Aug. 13, 2010, 11 pages.
Notice of Allowance for U.S. Appl. No. 12/388,956 mailed Jun. 14, 2011, 9 pages.
Notice of Allowance for U.S. Appl. No. 12/956,411 mailed Aug. 5, 2011, 8 pages.
Notice of Allowance for U.S. Appl. No. 12/982,395 mailed Apr. 24, 2013, 9 pages.
Notice of Allowance for U.S. Appl. No. 14/181,011 dated May 15, 2019, 9 pages.
Notice of Allowance for U.S. Appl. No. 15/137,371 mailed May 2, 2019, 11 pages.
Notice of Allowance for U.S. Appl. No. 15/427,746 mailed Dec. 4, 2019, 5 pages.
Notice of Allowance for U.S. Appl. No. 15/427,746 mailed Jul. 31, 2019, 8 pages.
Notice of Allowance received for U.S. Appl. No. 14/643,468, Oct. 24, 2018, 22 pages.
Notice of Allowance received for U.S. Appl. No. 14/181,011, Feb. 13, 2019, 9 pages.
Office Action for U.S. Appl. No. 14/193,294 dated Aug. 4, 2017, 31 pages.
Office Action for U.S. Appl. No. 14/193,294 dated Mar. 22, 2018, 28 pages.
Office Action for U.S. Appl. No. 14/193,294 dated Sep. 19, 2018, 27 pages.
Office Action for U.S. Appl. No. 14/229,043 dated Feb. 27, 2019, 18 pages.
Office Action for U.S. Appl. No. 14/229,043 dated Jul. 24, 2017, 19 pages.
Office Action for U.S. Appl. No. 14/229,043 dated Sep. 5, 2019, 22 pages.
Office Action for U.S. Appl. No. 14/229,043 dated Sep. 14, 2018, 17 pages.
Office Action for U.S. Appl. No. 14/643,468 dated Mar. 8, 2018, 11 pages.
Office Action for U.S. Appl. No. 15/085,166 dated Dec. 27, 2018, 24 pages.
Office Action for U.S. Appl. No. 15/085,166 dated Jun. 29, 2018, 19 pages.
Office Action for U.S. Appl. No. 15/085,166 dated Mar. 3, 2020, 25 pages.

(56) References Cited

OTHER PUBLICATIONS

Office Action for U.S. Appl. No. 15/085,166 dated Sep. 4, 2019, 23 pages.
Office Action for U.S. Appl. No. 15/422,184 dated Aug. 27, 2019, 16 pages.
Office Action for U.S. Appl. No. 15/422,184 dated Feb. 15, 2019, 15 pages.
Office Action for U.S. Appl. No. 15/422,184 dated Jan. 14, 2020, 19 pages.
Office Action for U.S. Appl. No. 15/422,184 dated Sep. 10, 2018, 13 pages.
Office Action for U.S. Appl. No. 15/925,011 dated Jun. 27, 2019, 15 pages.
Office Action for U.S. Appl. No. 15/925,011 dated Oct. 24, 2019, 19 pages.
Office Action for U.S. Appl. No. 15/925,948 dated Jun. 25, 2019, 13 pages.
Office Action for U.S. Appl. No. 15/925,948 dated Oct. 23, 2019, 18 pages.
Office Action for U.S. Appl. No. 12/570,982 mailed Apr. 8, 2015, 9 pages.
Office Action for U.S. Appl. No. 13/782,909 mailed Jun. 25, 2015, 16 pages.
Office Action for U.S. Appl. No. 13/804,175 mailed Mar. 13, 2015, 9 pages.
Office Action for U.S. Appl. No. 14/090,113 mailed Jun. 18, 2015, 14 pages.
Office Action for U.S. Appl. No. 14/090,122 mailed Oct. 21, 2016, 12 pages.
Office Action for U.S. Appl. No. 14/090,122 mailed Sep. 11, 2015, 10 pages.
Office Action for U.S. Appl. No. 14/181,011 mailed Feb. 29, 2016, 23 pages.
Office Action for U.S. Appl. No. 14/181,011 mailed Mar. 20, 2017, 28 pages.
Office Action for U.S. Appl. No. 14/181,011 mailed Oct. 20, 2016, 28 pages.
Office Action for U.S. Appl. No. 14/181,011 mailed Sep. 12, 2017, 17 pages.
Office Action for U.S. Appl. No. 14/193,294 mailed Dec. 17, 2015, 21 pages.
Office Action for U.S. Appl. No. 14/218,326 mailed Dec. 1, 2015, 13 pages.
Opar, Alisa; "Rising drug costs prompt new uses for old pills." Nature Medicine, 1211333 (2006).
PTAB Decision on Appeal for U.S. Appl. No. 14/145,027 mailed May 31, 2018, 11 pages.
PTAB Decision on Request for Rehearing for U.S. Appl. No. 14/145,027 mailed Aug. 30, 2018, 9 pages.
Sampson, R.J., Taking Control of Health Care Costs, Best's Review—Life Health Insurance Edition, Nov. 1983, vol. 84, Issue 7, USA; Abstract only.
Scientific and Technical Information Center, Report of Information from Dialog (NPL (non-patent literature) Search Results, Abstracts only), dated Nov. 1, 2021, (Year: 2021), 9 pages.
Siler, Sharon et al., "Safe Disposal of Unused Controlled Substances" Avalere Health 2008.
Strom, Stephanie; "Old Pills Finding New Medicine Cabinets" NY Times, May 18, 2005.
Subnotebooks, Phones, and More. St. Vincent's Gets on Track. Mobile Health Data [Online], Nov. 19, 2004. URL:http://www.awarix.com.
Supplemental Notice of Allowability received for U.S. Appl. No. 16/180,915, dated Jan. 28, 2021, 2 pages.
Supplemental Notice of Allowability received for U.S. Appl. No. 16/180,915, dated Mar. 12, 2021, 10 pages.
U.S. Notice of Allowance received for U.S. Appl. No. 16/819,258, dated Nov. 16, 2020, 8 pages, U.S.
U.S. Appl. No. 14/229,043, "Systems And Methods For Monitoring And Reporting Redemption Information At A Pharmacy For Patient Incentive Information Identified At The Time Of Prescribing," Unpublished (Filed Mar. 28, 2014), (Roger Pinsonneault, Inventor), (McKesson Corporation, Assignee), abandoned.
U.S. Appl. No. 15/084,034, "Prescription Provider System," Unpublished (filed Mar. 29, 2016), (Scott Genone, Inventor), (McKesson Corporation, Assignee), abandoned.
U.S. Appl. No. 15/085,166, "Alternative Therapy Identification System", Unpublished (filed Mar. 30, 2016), (Elizabeth Kaye, Inventor), (McKesson Corporation, Assignee), pending.
U.S. Appl. No. 16/832,318, "Method, Apparatus, And Computer Program Product for Estimated Prescription Costs", Unpublished (filed Mar. 27, 2020), (Stacy Hopkins, Inventor), (McKesson Corporation, Assignee), pending.
U.S. Appl. No. 16/792,413, "Method, Apparatus and Computer Program Product for Partitioning Prescription Transaction Costs in an Electronic Prescription Transaction," Unpublished (filed Feb. 17, 2020), (Jared Burdine, Inventor) (McKesson Corporation, Assignee).
U.S. Appl. No. 16/867,286, "Method, Apparatus, and Computer Program Product for Constructing Electronic Message Responses Dependent Upon Historical Information," Unpublished (filed May 5, 2020), (Jared Burdine, et al., Inventor) (McKesson Corporation, Assignee).
U.S. Appl. No. 17/012,565, "Method, Apparatus, and Computer Program Product for Performing an Alternative Evaluation Procedure in Response to an Electronic Message," Unpublished (filed Sep. 4, 2020), (Stacy Hopkins, et al., Inventors) (McKesson Corporation, Assignee).
U.S. Appl. No. 17/092,705, "Computing System and Method for Automatically Reversing an Action Indicated by an Electronic Message," Unpublished (filed Nov. 9, 2020), (Patrick Harris, Inventor) (McKesson Corporation, Assignee).
United States Patent and Trademark Office, Advisory Action for U.S. Appl. No. 15/422,184, Jun. 25, 2019, 4 pages, U.S.A.
United States Patent and Trademark Office, Advisory Action for U.S. Appl. No. 15/422,184, Mar. 26, 2020, 5 pages, U.S.A.
United States Patent and Trademark Office, Advisory Action for U.S. Appl. No. 15/925,011, Jan. 31, 2020, 3 pages, U.S.A.
United States Patent and Trademark Office, Advisory Action for U.S. Appl. No. 15/925,948, Jan. 31, 2020, 4 pages, U.S.A.
United States Patent and Trademark Office, Advisory Action received for U.S. Appl. No. 16/453,509, dated Oct. 12, 2021, 5 pages, U.S.
United States Patent and Trademark Office, Corrected Notice of Allowability received for U.S. Appl. No. 15/085,166, dated Sep. 20, 2021, 6 pages, U.S.
United States Patent and Trademark Office, Final Office Action received for U.S. Appl. No. 16/453,509, dated Aug. 18, 2021, 16 pages, U.S.
United States Patent and Trademark Office, Final Office Action received for U.S. Appl. No. 16/551,962, dated Nov. 4, 2021, 32 pages, U.S.
United States Patent and Trademark Office, Final Office Action received for U.S. Appl. No. 16/832,318, dated Nov. 3, 2021, 22 pages, U.S.
United States Patent and Trademark Office, Final Office Action received for U.S. Appl. No. 16/792,413, dated Jan. 10, 2022, 80 pages, U.S.
United States Patent and Trademark Office, Non-Final Office Action received for U.S. Appl. No. 16/792,413, dated Aug. 5, 2021, 32 pages, U.S.
United States Patent and Trademark Office, Non-Final Office Action received for U.S. Appl. No. 15/085,166, dated Jan. 10, 2022, 12 pages, U.S.
United States Patent and Trademark Office, Notice of Allowability received for U.S. Appl. No. 15/422,184, Nov. 16, 2020, 2 pages, U.S.A.
United States Patent and Trademark Office, Notice of Allowance received for U.S. Appl. No. 15/422,184, Oct. 13, 2020, 12 pages, U.S.A.
United States Patent and Trademark Office, Notice of Allowance received for U.S. Appl. No. 15/925,948, Nov. 5, 2020, 22 pages, U.S.A.

(56) References Cited

OTHER PUBLICATIONS

United States Patent and Trademark Office, Notice of Allowance received for U.S. Appl. No. 15/085,166, dated Sep. 10, 2021, 21 pages, U.S.

United States Patent and Trademark Office, Notice of Allowance received for U.S. Appl. No. 17/092,705, dated Dec. 23, 2021, 42 pages, U.S.

United States Patent and Trademark Office, Notice of Allowance received for U.S. Appl. No. 16/043,401, dated Aug. 10, 2020, 9 pages, U.S.A.

United States Patent and Trademark Office, Office Action for U.S. Appl. No. 15/925,011, Apr. 8, 2020, 17 pages, U.S.A.

United States Patent and Trademark Office, Office Action for U.S. Appl. No. 15/925,948, Mar. 23, 2020, 29 pages, U.S.A.

United States Patent and Trademark Office, Office Action received for U.S. Appl. No. 15/422,184, May 18, 2020, 31 pages, U.S.A.

United States Patent and Trademark Office, Office Action received for U.S. Appl. No. 15/925,011, Oct. 8, 2020, 8 pages, U.S.A.

Wisconsin Physicians Service (WPS) Insurance Corporation, "How to Read Your Explanation of Benefits Chart," Jun. 16, 2012.

www.ncoil.org/news/DrugCards2.doc dated Apr. 2002, 5 pages.

United States Patent and Trademark Office, Notice of Allowance received for U.S. Appl. No. 16/552,021, dated Oct. 20, 2022, 14 pages, U.S.

Dubois, Robert W., "Rx Drug Costs: List Prices Versus Net Prices And The Importance Of Staying Within The Data", Health Affairs Blog, Mar. 2019, 7 pages.

Kamal, Rabah, et al., "What are the recent and forecasted trends in prescription drug spending?" Peterson-KFF Health System Tracker, Feb. 20, 2019, 19 pages, Peterson Center on Healthcare.

Cepeda, Maria Soledad, et al., "Quantification of missing prescriptions in commercial claims databases : results of a cohort study.", Pharmacoepidemiology and Drug Safety, Apr. 2017, pp. 386-392, vol. 26, Epub Jan. 25, 2017 on Wiley Online Library.

United States Patent and Trademark Office, Final Office Action received for U.S. Appl. No. 16/867,286, dated Sep. 8, 2022, 19 pages, U.S.

United States Patent and Trademark Office, Notice of Allowance received for U.S. Appl. No. 16/792,413, dated Sep. 8, 2022, 18 pages, U.S.

United States Patent and Trademark Office, Notice of Allowance received for U.S. Appl. No. 17/012,565, dated Sep. 21, 2022, 11 pages, U.S.

United States Patent and Trademark Office, Notice of Allowance received for U.S. Appl. No. 16/453,509, dated Oct. 3, 2022, 23 pages, U.S.

United States Patent and Trademark Office, Final Office Action received for U.S. Appl. No. 17/175,939, dated Oct. 5, 2022, 30 pages, U.S.

United States Patent and Trademark Office, Nonfinal Office Action received for U.S. Appl. No. 17/162,461, dated Oct. 5, 2022, 47 pages, U.S.

United States Patent and Trademark Office, Nonfinal Office Action received for U.S. Appl. No. 17/158,118, dated Oct. 7, 2022, 46 pages, U.S.

United States Patent and Trademark Office, Non-Final Office Action received for U.S. Appl. No. 17/846,373, dated Apr. 5, 2024, 76 pages.

United States Patent and Trademark Office, Final Office Action received for U.S. Appl. No. 17/674,366, dated Dec. 15, 2023, 53 pages, US.

United States Patent and Trademark Office, Final Office Action received for U.S. Appl. No. 17/144,426, dated Dec. 19, 2023, 22 pages, US.

United States Patent and Trademark Office, Final Office Action received for U.S. Appl. No. 17/158,118, dated Dec. 19, 2023, 22 pages, US.

United States Patent and Trademark Office, Non-Final Office Action received for U.S. Appl. No. 16/816,460, dated Dec. 22, 2023, 46 pages, US.

Liu, Shiyong, et al., "Evaluating Cost-Effectiveness Of Treatment Options For Diabetes Patients Using System Dynamics Modeling", Proceeding of the 2018 Winter Simulation Conference (WSC), Dec. 9-12, 2018, pp. 2577-2588, IEEE, Gothenburg, Sweden.

Tiriveedhi, V., "Impact of Precision Medicine on Drug Repositioning and Pricing: A Too Small to Thrive Crisis", Journal of Personalized Medicine, Nov. 5, 2018, 11 pages, vol. 8, No. 36, MDPI, Switzerland.

United States Patent and Trademark Office, Notice of Allowance received for U.S. Appl. No. 17/705,919, dated Sep. 3, 2024, 13 pages, USA.

United States Patent and Trademark Office, Notice of Allowance received for U.S. Appl. No. 17/675,616, dated Sep. 25, 2024, 21 pages, USA.

United States Patent and Trademark Office, Notice of Allowance received for U.S. Appl. No. 17/676,437, dated Sep. 25, 2024, 20 pages, USA.

Bowman, Michelle, et al., "Risk Assessment of Pharmacies & Electronic Prescriptions," 2019 IEEE/ACM International Conference on Advances in Social Networks Analysis and Mining (ASONAM), Aug. 27-30, 2019, pp. 641-644, Vancouver, BC, Canada.

United States Patent and Trademark Office, Final Office Action received for U.S. Appl. No. 16/816,460, dated May 3, 2024, 22 pages, U.S.

United States Patent and Trademark Office, Non-Final Office Action received for U.S. Appl. No. 17/675,616, dated May 8, 2024, 74 pages, U.S.

United States Patent and Trademark Office, Non-Final Office Action received for U.S. Appl. No. 17/676,437, dated May 9, 2024, 73 pages, U.S.

United States Patent and Trademark Office, Non-Final Office Action received for U.S. Appl. No. 17/012,565, dated Apr. 12, 2022, 19 pages, U.S.A.

United States Patent and Trademark Office, Non-Final Office Action received for U.S. Appl. No. 16/453,509, dated Apr. 28, 2022, 16 pages, U.S.A.

United States Patent and Trademark Office, Non-Final Office Action received for U.S. Appl. No. 16/552,021, dated May 3, 2022, 60 pages, U.S.A.

United States Patent and Trademark Office, Non-Final Office Action received for U.S. Appl. No. 17/175,939, dated May 12, 2022, 48 pages, U.S.A.

United States Patent and Trademark Office, Advisory Action received for U.S. Appl. No. 16/867,286, dated Feb. 6, 2023, 3 pages, US.

United States Patent and Trademark Office, Advisory Action received for U.S. Appl. No. 17/144,426, dated Mar. 3, 2023, 6 pages, US.

United States Patent and Trademark Office, Final Office Action received for U.S. Appl. No. 17/158,118, dated Mar. 3, 2023, 19 pages, US.

Chu, Kuan-Yu, et al., "Incremental analysis of the reengineering of an outpatient billing process: an empirical study in a public hospital", BMC Health Services Research, Jun. 13, 2013, vol. 13, No. 215, 8 pages, BioMed Central LTD, UK.

Google Patents Search (including Web Search History, Prior Art Search Printable History Generator) on "pharmacy payment benefit copay NDC database) (prescription) (code) (refills) (error code) country: US before:filing: Dec. 31, 2013", retrieved from the Internet at <https://patents.google.com/?q=pharmacy+payment+benefit+copay+NDC+database&q=prescription&q=code&q=refills&q=error+code&country=US&before=filing:20131231> retrieved on Jun. 1, 2022, 4 pages.

Google Scholar Search (including Web Search History, Prior Art Search Printable History Generator) on "pharmacy payment benefit copay NDC database prescription . . . ", retrieved from the Internet at <https://scholar.google.com/scholar?hl=en&as_sdt=0%2C47&as_ylo=2010&as_yhi=2013&q=pharmacy+payment+benefit+copay+NDC+database+pres . . . > retrieved on Jun. 1, 2022, 3 pages.

United States Patent and Trademark Office, Non-Final Office Action received for U.S. Appl. No. 16/792,413, dated May 24, 2022, 48 pages, US.

United States Patent and Trademark Office, Non-Final Office Action received for U.S. Appl. No. 17/144,426, dated May 31, 2022, 42 pages, US.

(56) References Cited

OTHER PUBLICATIONS

United States Patent and Trademark Office, Non-Final Office Action received for U.S. Appl. No. 16/832,318, dated Jun. 8, 2022, 17 pages, US.

United States Patent and Trademark Office, Notice of Allowance received for U.S. Appl. No. 17/092,705, dated May 31, 2022, 9 pages, US.

United States Patent and Trademark Office, Notice of Allowance received for U.S. Appl. No. 17/219,526, dated Jun. 2, 2022, 8 pages, US.

United States Patent and Trademark Office, Notice of Allowance received for U.S. Appl. No. 16/551,962, dated Jun. 8, 2022, 11 pages, US.

United States Patent and Trademark Office, Examiner Interview Summary received for U.S. Appl. No. 18/098,150, dated Nov. 18, 2024, 3 pages, U.S.

United States Patent and Trademark Office, Non-Final Office Action received for U.S. Appl. No. 16/816,460, dated Nov. 21, 2024, 28 pages, US.

United States Patent and Trademark Office, Examiner Interview Summary received for U.S. Appl. No. 17/175,939, dated Dec. 3, 2024, 2 pages, US.

United States Patent and Trademark Office, Final Office Action received for U.S. Appl. No. 17/144,426, dated Dec. 19, 2024, 22 pages, U.S.

United States Patent and Trademark Office, Final Office Action received for U.S. Appl. No. 17/158,118, dated Dec. 19, 2024, 24 pages, US.

United States Patent and Trademark Office, Examiner Interview Summary received for U.S. Appl. No. 17/144,426, dated Oct. 22, 2024, 8 pages, U.S.

United States Patent and Trademark Office, Examiner Interview Summary received for U.S. Appl. No. 17/158,118, dated Oct. 22, 2024, 8 pages, U.S.

United States Patent and Trademark Office, Non-Final Office Action received for U.S. Appl. No. 17/499,976, dated Oct. 1, 2024, 79 pages, U.S.

United States Patent and Trademark Office, Non-Final Office Action received for U.S. Appl. No. 17/175,939, dated Oct. 24, 2024, 17 pages, U.S.

Davies, Rory, "Specialty drugs: Four options for managing costs: with specialty drug costs growing at a double-digit pace and new drugs entering the market, plan sponsors struggle to keep up. The author describes challenges plan sponsors face with some particular high-cost drugs and offers four cost-control strategies", Essay, Benefits Magazine, Jun. 2017, 9 pages, vol. 54, No. 6, International Foundation of Employee Benefit Plans, US.

U.S. Appl. No. 17/491,870, "Method, Apparatus, And Computer Program Product For Using Machine Learning To Generate an Offset Amount", Unpublished (filing date Oct. 1, 2021), (Jared Burdine, Inventor), (McKesson Corporation, Assignee).

U.S. Appl. No. 19/053,907, "Method, Apparatus, and Computer Program Product for Evaluating Prescription Transaction in Accordance with a Database", Unpublished (filing date Feb. 14, 2025), (Phillip Draa, Inventor), (McKesson Corporation, Assignee).

U.S. Appl. No. 19/053,939, "Method, Apparatus, and Computer Program Product for Partitioning Prescription Transaction Costs in an Electronic Prescription Transaction", Unpublished (filing date Feb. 14, 2025), (Phillip Draa, Inventor), (McKesson Corporation, Assignee).

United States Patent and Trademark Office, Examiner Interview Summary received for U.S. Appl. No. 17/491,870, dated Sep. 23, 2024, 3 pages, US.

United States Patent and Trademark Office, Examiner Interview Summary received for U.S. Appl. No. 16/797,277, dated Aug. 10, 2022, 7 pages, US.

United States Patent and Trademark Office, Final Office Action received for U.S. Appl. No. 17/175,939, dated Feb. 13, 2025, 16 pages, US.

United States Patent and Trademark Office, Final Office Action received for U.S. Appl. No. 18/098,150, dated Feb. 27, 2025, 25 pages, US.

United States Patent and Trademark Office, Final Office Action received for U.S. Appl. No. 17/499,976, dated Mar. 3, 2025, 16 pages, US.

United States Patent and Trademark Office, Final Office Action received for U.S. Appl. No. 16/816,460, dated Mar. 7, 2025, 27 pages, US.

United States Patent and Trademark Office, Final Office Action received for U.S. Appl. No. 16/797,277, dated Sep. 12, 2022, 23 pages, US.

United States Patent and Trademark Office, Final Office Action received for U.S. Appl. No. 17/491,870, dated Jan. 27, 2025, 16 pages, US.

United States Patent and Trademark Office, Non-Final Office Action received for U.S. Appl. No. 17/162,461, dated Feb. 10, 2025, 36 pages, US.

United States Patent and Trademark Office, Non-Final Office Action received for U.S. Appl. No. 18/138,414, dated Feb. 13, 2025, 68 pages, US.

United States Patent and Trademark Office, Non-Final Office Action received for U.S. Appl. No. 16/797,277, dated May 17, 2022, 17 pages, US.

United States Patent and Trademark Office, Non-Final Office Action received for U.S. Appl. No. 17/491,870, dated Jun. 28, 2024, 18 pages, US.

United States Patent and Trademark Office, Notice of Allowance received for U.S. Appl. No. 16/797,277, dated Dec. 21, 2022, 26 pages, US.

United States Patent and Trademark Office, Notice of Allowance received for U.S. Appl. No. 17/144,426, filed Apr. 2, 2025, 9 pages, U.S.A.

United States Patent and Trademark Office, Interview Summary received for U.S. Appl. No. 18/138,414, dated May 9, 2025, 2 pages, US.

United States Patent and Trademark Office, Non-Final Office Action received for U.S. Appl. No. 17/499,976, dated Jul. 2, 2025, 22 pages, US.

United States Patent and Trademark Office, Notice of Allowance and Interview Summary received for U.S. Appl. No. 18/138,414, filed Jul. 15, 2025, 24 pages, US.

United States Patent and Trademark Office, Non-Final Office Action received for U.S. Appl. No. 17/178,509, dated Mar. 29, 2023, 14 pages, US.

United States Patent and Trademark Office, Examiner Interview Summary received for U.S. Appl. No. 17/178,509, dated Jun. 14, 2023, 8 pages, US.

United States Patent and Trademark Office, Final Office Action received for U.S. Appl. No. 17/178,509, dated Jul. 11, 2023, 15 pages, ;US.

United States Patent and Trademark Office, Advisory Action received for U.S. Appl. No. 17/178,509, dated Sep. 18, 2023, 4 pages, US.

United States Patent and Trademark Office, Non-Final Office received for U.S. Appl. No. 17/178,509, dated Dec. 8, 2023, 15 pages, US.

United States Patent and Trademark Office, Examiner Interview Summary for U.S. Appl. No. 17/178,509, dated Mar. 7, 2024, 9 pages, US.

United States Patent and Trademark Office, Final Office received for U.S. Appl. No. 17/178,509, dated Mar. 15, 2024, 19 pages, US.

United States Patent and Trademark Office, Advisory Action and Interview Summary received for U.S. Appl. No. 17/178,509, dated Jun. 26, 2024, 5 pages, US.

United States Patent and Trademark Office, Non-Final Office Action received for U.S. Appl. No. 17/178,509, dated Nov. 7, 2024, 13 pages.

United States Patent and Trademark Office, Interview Summary received for U.S. Appl. No. 17/178,509, dated Feb. 4, 2025, 10 pages.

United States Patent and Trademark Office, Final Office Action received for U.S. Appl. No. 17/178,509, dated Feb. 21, 2025, 13 pages.

(56) References Cited

OTHER PUBLICATIONS

United States Patent and Trademark Office, Examiner's Answer to Appeal Brief received for U.S. Appl. No. 17/178,509, dated Aug. 15, 2025, 8 pages.

U.S. Appl. No. 17/178,509, "Method, Apparatus, And Computer Program Product For Standardizing An Electronic Message Component", Unpublished (filing date Feb. 18, 2021), (Ashley Proctor, Inventor), (McKesson Corporation, Assignee).

United States Patent and Trademark Office, Final Office Action received for U.S. Appl. No. 17/162,461, dated Aug. 22, 2025, 23 pages.

United States Patent and Trademark Office, Notice of Allowance received for U.S. Appl. No. 17/158,118, dated Aug. 25, 2025, 13 pages.

United States Patent and Trademark Office, Non-Final Office Action received for U.S. Appl. No. 16/816,460, dated Sep. 8, 2025, 31 pages, US.

United States Patent and Trademark Office, PTAB Decision on Appeal received for U.S. Appl. No. 16/867,286, dated Sep. 25, 2025, 19 pages, US.

United States Patent and Trademark Office, Notice of Allowance received for U.S. Appl. No. 18/098,150, dated Oct. 8, 2025, 19 pages, US.

United States Patent and Trademark Office, Examiner's Answer received for U.S. Appl. No. 17/175,939, dated Oct. 27, 2025, 8 pages, US.

United States Patent and Trademark Office, Non-Final Office Action received for U.S. Appl. No. 17/491,870, dated Nov. 20, 2025, 60 pages, US.

\* cited by examiner

METHOD, APPARATUS, AND COMPUTER PROGRAM PRODUCT FOR PROVIDING REAL-TIME PRICING INFORMATION

CROSS REFERENCES TO RELATED APPLICATIONS

This application is a continuation-in-part of U.S. patent application Ser. No. 16/453,509, filed Jun. 26, 2019 and titled, "Method, Apparatus, And Computer Program Product For Providing Estimated Prescription Costs," which is hereby incorporated by reference in its entirety.

TECHNOLOGICAL FIELD

Embodiments of the present invention relate generally to healthcare transactions and inquiries, and more particularly, to methods, apparatuses, and computer program products for providing real-time pricing information.

BACKGROUND

In the healthcare services industry, patients have difficulty finding pricing information for prescription drugs. In some instances, patients may not be aware of the cost of a prescription until they visit the pharmacy to purchase the prescription. As today's healthcare provider systems continue to evolve, so does the challenge in enabling the patient to understand their out-of-pocket cost. Still further, with developments in cash discount cards and/or systems, in some instances presenting a cash discount card rather than submitting a prescription benefit claim may result in a different cost for the same prescription drug. Additionally, alternative formularies may be available as suitable substitution for a medication, and may be available for a lower cost to the patient in comparison to a prescribed medication, through the benefit plan or a cash discount system. However, a patient typically does not have access to information regarding formulary alternatives and associated costs. Financial structures for prescription claims have become even more sophisticated over time (i.e. formulary tiers, deductibles, maximum benefits, etc.), and prices can vary greatly between pharmacies, making it even more difficult for patients to understand their prescription drugs costs. With the complexities of drug pricing, cash discount systems, insurance pricing agreements, and variation amongst pharmacies, patients particularly have difficulty understanding the costs of the prescriptions.

BRIEF SUMMARY

Methods, apparatuses, and computer program products are therefore provided for providing a prescription inquiry response to a client device. Example embodiments receive a prescription inquiries from client devices and generate cash price inquiries, prescription benefit inquires, and formulary alternative inquiries accordingly. A network is monitored for associated responses and a prescription inquiry response is generated based on the various responses from different sources communicatively connected via the network, for provision to the patient.

A computer-implemented method is provided, comprising receiving, by one or more service provider computers comprising one or more processors, and from a client device, a prescription inquiry associated with a patient, a pharmacy, and a medication. The computer-implemented method further includes generating a cash price inquiry, a prescription benefit inquiry, and a formulary alternative inquiry based on the prescription inquiry. The computer-implemented method further includes determining a claims processor computer to which to transmit the prescription benefit inquiry, and transmitting the prescription benefit coverage inquiry to the pharmacy claims processor computer. The computer-implemented method further includes monitoring a network for receipt of a prescription benefit coverage response associated with the prescription benefit coverage inquiry from the claims processor computer, and executing the cash price inquiry to receive a cash price response. The computer-implemented method further includes executing the formulary alternative inquiry to receive an alternative formulary response, and generating a prescription inquiry response by processing data from at least the prescription benefit coverage response, the cash price response, and the alternative formulary response. The computer-implemented method further includes transmitting the prescription inquiry response to the client device associated with the prescription inquiry, and causing display of the prescription inquiry response via the client device.

In certain embodiments, executing the formulary alternative inquiry comprises querying one or more alternative therapy tables for an alternative product equivalent to the medication. In certain embodiments, executing the formulary inquiry comprises generating at least one additional prescription benefit inquiry and an additional cash price inquiry based on the alternative formulary response. In certain embodiments, executing the cash price inquiry comprises accessing cash transaction history associated with the pharmacy to estimate a cash price for the prescribed medication at the pharmacy. The computer-implemented method may further include providing an option for user engagement to initiate transmission of a message to at least one of a pharmacy computer or prescriber computer regarding the prescription inquiry.

According to certain embodiments, the cash price inquiry, the prescription benefit inquiry, and the formulary alternative inquiry are in different formats that the prescription inquiry.

An apparatus is provided, comprising at least one processor and at least one memory including computer program code, the at least one memory and the computer program code configured to, with the processor, cause the apparatus to at least receive by one or more service provider computers, and from a client device, a prescription inquiry associated with a patient, a pharmacy, and a medication. The at least one memory and the computer program code are further configured to, with the processor, cause the apparatus to generate a cash price inquiry, a prescription benefit inquiry, and a formulary alternative inquiry based on the prescription inquiry, and determine a claims processor computer to which to transmit the prescription benefit inquiry. The at least one memory and the computer program code are further configured to, with the processor, cause the apparatus to transmit the prescription benefit coverage inquiry to the pharmacy claims processor computer, and monitor a network for receipt of a prescription benefit coverage response associated with the prescription benefit coverage inquiry from the claims processor computer. The at least one memory and the computer program code are further configured to, with the processor, cause the apparatus to execute the cash price inquiry to receive a cash price response, execute the formulary alternative inquiry to receive an alternative formulary response, and generate a prescription inquiry response by processing data from at least the prescription benefit coverage response, the cash price response, and the alternative formulary response. The at least one memory and the computer program code are further configured to, with the processor, cause the apparatus to transmit the prescription inquiry response to the client device associated with the prescription inquiry, and cause display of the prescription inquiry response via the client device.

In certain embodiments, the at least one memory and the computer program code are further configured to, with the processor, cause the apparatus to at least provide an option for user engagement to initiate transmission of a message to at least one of a pharmacy computer or prescriber computer regarding the prescription inquiry.

A computer program product is provided, comprising at least one non-transitory computer-readable storage medium having computer-executable program code instructions stored therein, the computer-executable program code instructions comprising program code instructions to receive by one or more service provider computers, and from a client device, a prescription inquiry associated with a patient, a pharmacy, and a medication. The computer-executable program code instructions further include program code instructions to generate a cash price inquiry, a prescription benefit inquiry, and a formulary alternative inquiry based on the prescription inquiry. The computer-executable program code instructions further include program code instructions determine a claims processor computer to which to transmit the prescription benefit inquiry, and transmit the prescription benefit coverage inquiry to the pharmacy claims processor computer. The computer-executable program code instructions further include program code instructions to monitor a network for receipt of a prescription benefit coverage response associated with the prescription benefit coverage inquiry from the claims processor computer, execute the cash price inquiry to receive a cash price response, and execute the formulary alternative inquiry to receive an alternative formulary response. The computer-executable program code instructions further include program code instructions to generate a prescription inquiry response by processing data from at least the prescription benefit coverage response, the cash price response, and the alternative formulary response, transmit the prescription inquiry response to the client device associated with the prescription inquiry, and
cause display of the prescription inquiry response via the client device.

In certain embodiments, the computer-executable program code instructions further include program code instructions to provide an option for user engagement to initiate transmission of a message to at least one of a pharmacy computer or prescriber computer regarding the prescription inquiry.

An apparatus is provided, with means for receiving, by one or more service provider computers comprising one or more processors, and from a client device, a prescription inquiry associated with a patient, a pharmacy, and a medication. The apparatus further includes means for generating a cash price inquiry, a prescription benefit inquiry, and a formulary alternative inquiry based on the prescription inquiry. The apparatus further includes means for determining a claims processor computer to which to transmit the prescription benefit inquiry, and means for transmitting the prescription benefit coverage inquiry to the pharmacy claims processor computer. The apparatus further includes means for monitoring a network for receipt of a prescription benefit coverage response associated with the prescription benefit coverage inquiry from the claims processor computer, and means for executing the cash price inquiry to receive a cash price response. The apparatus further includes means for executing the formulary alternative inquiry to receive an alternative formulary response, and generating a prescription inquiry response by processing data from at least the prescription benefit coverage response, the cash price response, and the alternative formulary response. The apparatus further includes means for transmitting the prescription inquiry response to the client device associated with the prescription inquiry, and causing display of the prescription inquiry response via the client device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
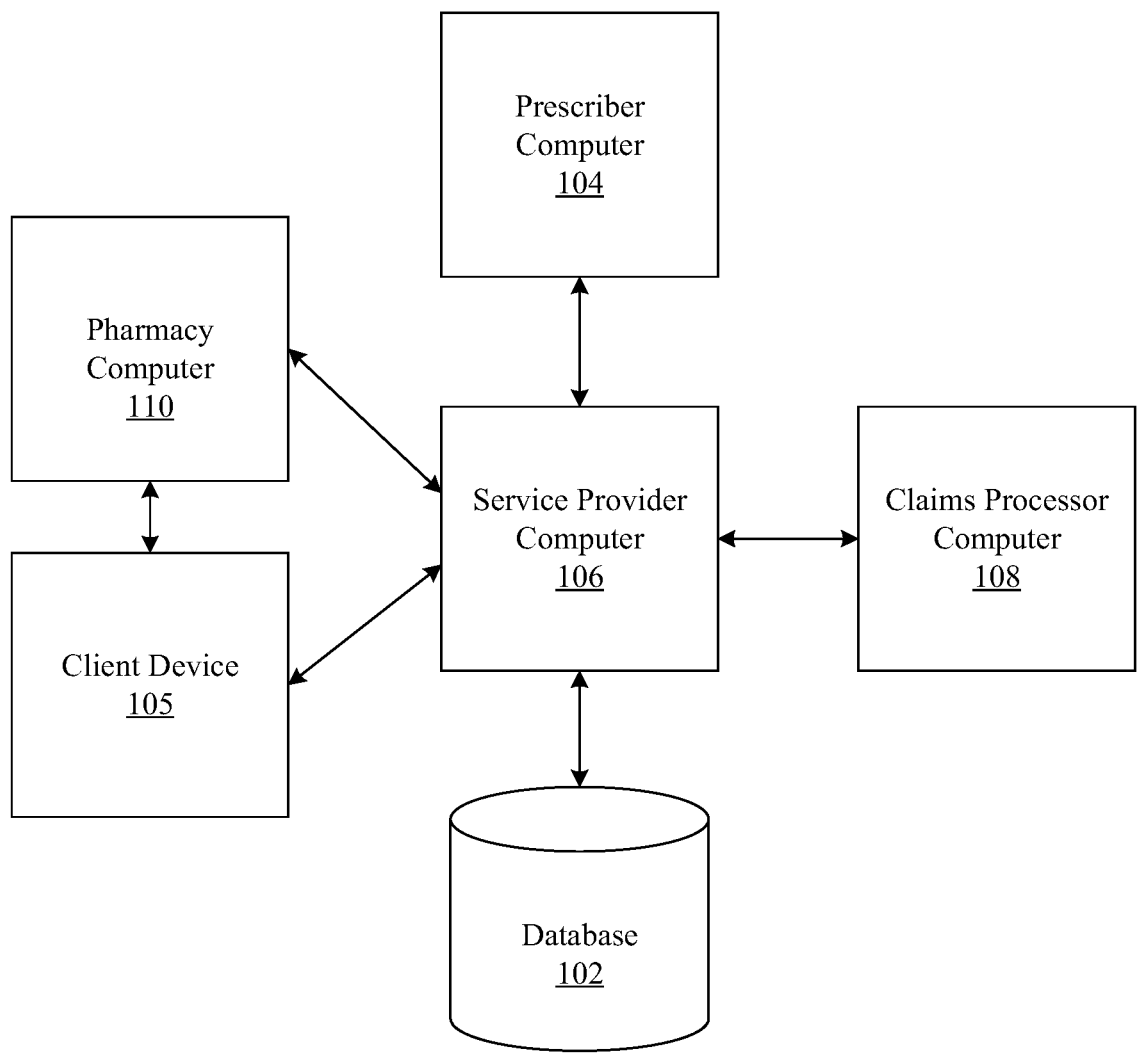
Figure 2:
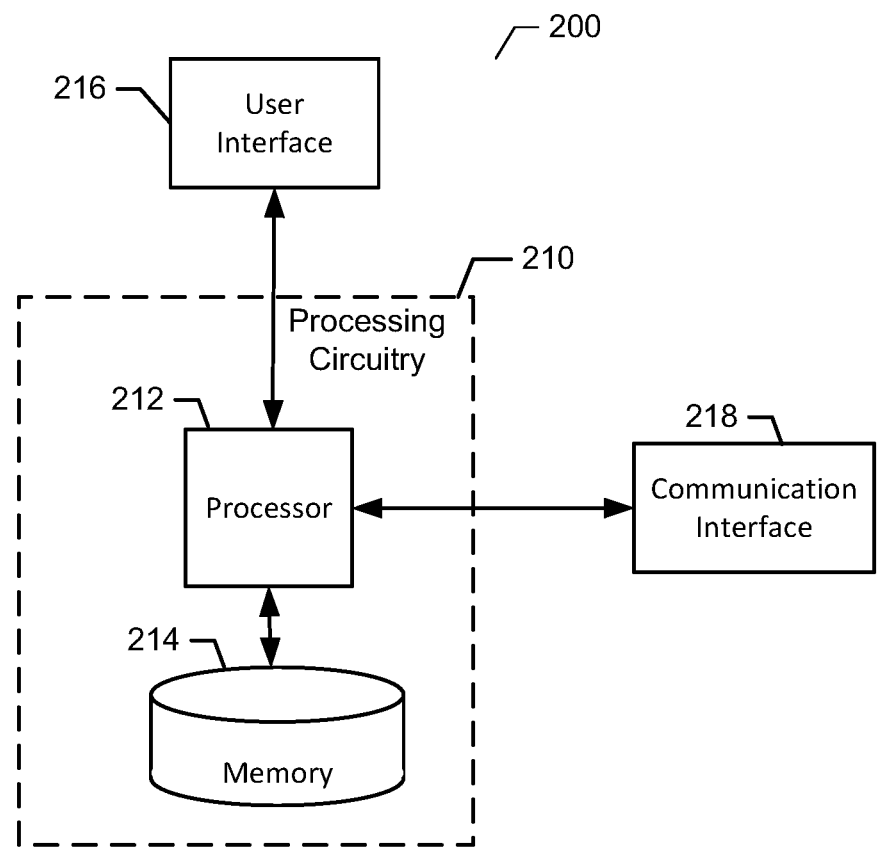
Figure 3:
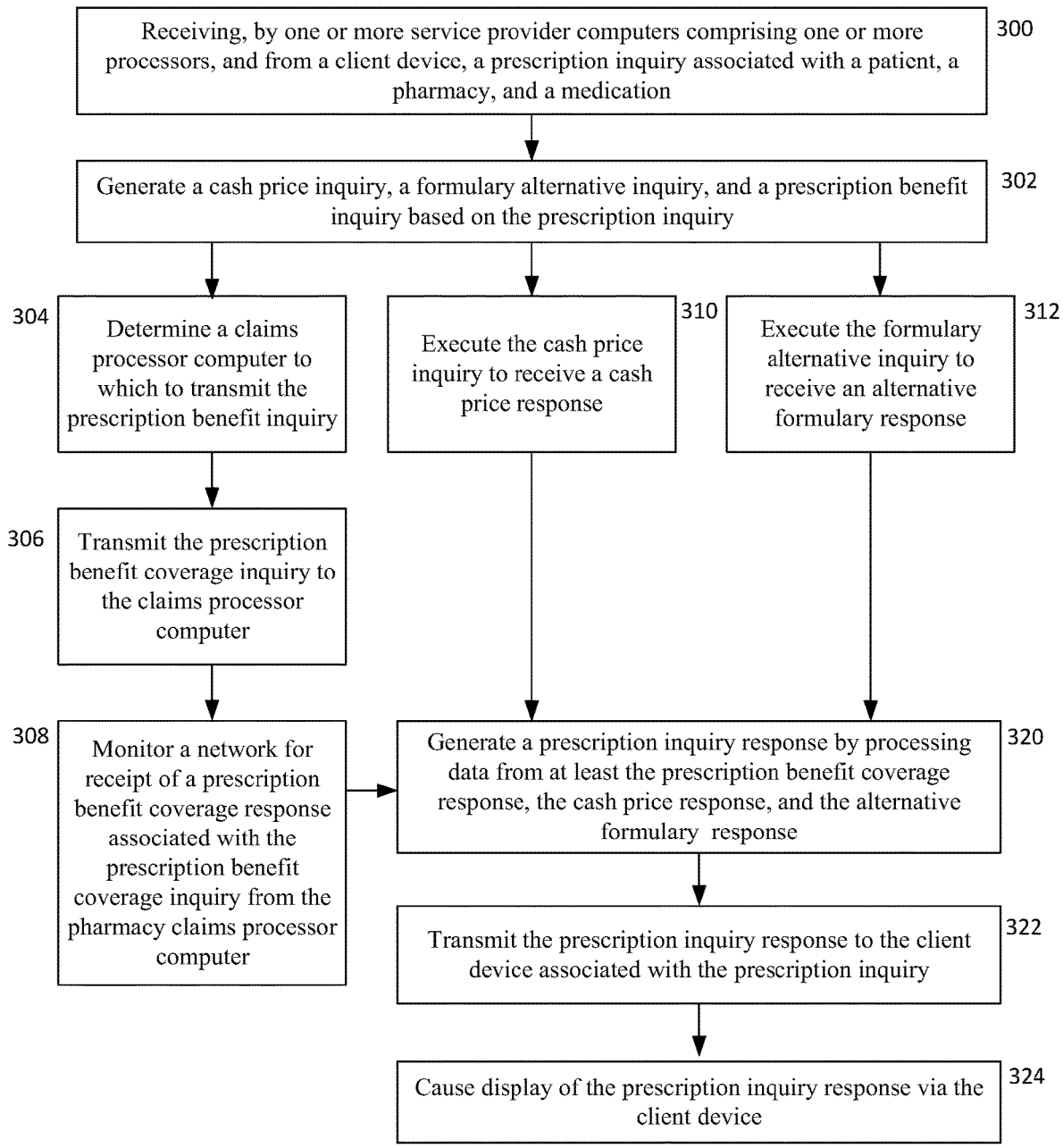

Having thus described embodiments of the invention in general terms, reference will now be made to the accompanying drawings, which are not necessarily drawn to scale, and wherein:

FIG. 1 is an example overview of a system that can be used to practice some example embodiments described herein;

FIG. 2 is an exemplary schematic diagram of an apparatus in accordance with some example embodiments; and FIG. 3 is a flowchart of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that can be utilized to perform operations according to certain example embodiments described herein. The prescriber computer 104 may be optional in certain embodiments, but when present, may be associated with a healthcare provider, such as an entity that may prescribe medication and/or treatments, for example, a physician's office, clinic, long-term care facility, hospital, etc. While the exemplary prescriber computer 104 may be frequently referenced herein as part of a physician's office or healthcare network, the prescriber computer 104 may be associated with any other healthcare provider, such as a hospital, urgent care center, dentist, and/or other medical facility.

The prescriber computer 104 may be any processor-driven device that facilitates the processing of electronic prescription inquiries and/or prescription submission made by physicians or clinical staff, and the communication of information associated with prescription inquiries and/or prescription submission to the service provider computer 106. The execution of the computer-implemented instructions by the prescriber computer 104 may form a special purpose computer or other particular machine that is operable to facilitate the submission of prescription benefit coverage inquiries made by physicians, doctors, clinical staff, pharmacists, and/or the like.

The client device 105 may include any user device such as a personal computer, smartphone, laptop, smartwatch, and/or the like. A user of the client device 105, such as a patient, may access the service provider computer 106 (optionally via a service of the pharmacy computer 110 such as a website or mobile "app" of the pharmacy computer 110) to seek pricing information regarding a prescription. The client device 105 may make requests to such a service via a browser, a mobile application, or "app," operative on the client device 105. In this regard, the client device 105 may be operative as a client device in client-server communications with the pharmacy computer and/or service provider computer 106.

The service provider computer 106 may include, but is not limited to, a processor-driven device that is configured for receiving, processing, and fulfilling prescription inquiries from the client device 105, prescriber computer 104, and/or pharmacy computer 110 regarding prescription pricing and/or other prescription related information. In certain embodiments, a patient may initially access a service of the pharmacy computer 110, which in turn may transmit requests to the service provider computer 106 regarding prescription pricing information.

The service provider computer 106 may be further configured for receiving, processing, and fulfilling inquiries, responses, and/or requests from the client device 105, pharmacy computer 110, prescriber computer 110 and/or the claims processor computer 108, relating to prescription benefit coverage inquiries, prescription tracking, claims processing, benefits, billing, other healthcare transactions, and/or other related activities. Additionally or alternatively, the service provider computer 106 may be operable to facilitate the receipt, routing, and/or processing of prescription inquiries and/or associated responses amongst various components and/or subsystems such as, but not limited to, those depicted in FIG. 1.

In certain exemplary embodiments, the service provider computer 106 may be configured as or may comprise a switch or router that evaluates, processes, modifies, reformats, generates, and/or routes prescription inquiries and/or other healthcare transactions. For example, the service provider computer 106 may route prescription inquiries communicated from the prescriber computer 104, client device 105, and/or pharmacy computer 110 to a claims processor computer 108, such as that associated with a pharmacy benefits manager (PBM), an insurer, a Medicare or other government healthcare insurance program payor, or other payor. In certain embodiments, the service provider computer 106 may include a cash price inquiry module configured to generate and/or execute cash price inquiries, such that a cash price response is generated and/or received according to example embodiments and as described in further detail herein. The service provider computer 106 may further include an alternative formulary module configured to generate and/or execute formulary alternative inquiries, such that an alternative formulary response is generated and/or received according to example embodiments and as described in further detail herein.

Additionally or alternatively, the service provider computer 106 may reformat prescription inquiries into another form of transaction and modify the recipient information of the reformatted transaction before routing the reformatted transaction to another party, such as a claims processor computer 108. The service provider computer 106 may also direct a prescription inquiry to a claims processor computer 108, which may in turn route a response to the service provider computer 106. The service provider computer 106 may then direct the response to the pharmacy computer 110, client device 105, or other associated entity.

In addition to receiving and storing information, the service provider computer 106 may be further operable to access and/or be in communication with one or more suitable data storage devices, such as a database 102, for storing historical data and/or other various data. In some embodiments, the database 102 comprises data relating to prescription transactions associated with one or more pharmacy computers 110. Data, such as for example, historical data, may be provided by and/or stored in database 102 by a number of entities which may comprise the prescriber computer 104, service provider computer 106, claims processor computer 108, one or more pharmacy computers 110 and/or other related entities. In certain embodiments, data is provided to database 102 by one or more pharmacy computers 110 associated with one or more pharmacies. These one or more pharmacy computers 110 may voluntarily provide data to database 102 (and/or service provider computer 106, which may in turn store the historical data on database 102), such as historical data related to prior prescription transactions that have taken place at each respective pharmacy. In this regard, the historical data may comprise paid amounts by consumers (e.g., patients) at particular pharmacies for particular prescriptions, and may reflect cash prices (without any insurance payment or coverage), and/or may reflect paid amounts by the consumer given a paid and/or adjudicated prescription claim by the claims processor computer 108. In an embodiment, the one or more pharmacies may be taking part in a program wherein certain data is supplied to database 102 by the one or more pharmacy computers 110 associated with the one or more pharmacies in an effort to provide patients (and prescribers) with accurate cost information. According to some embodiments, the historical data may indicate other characteristics about respective prescription transactions, such as the state or other location information of the dispensing pharmacy, the dispense date, information regarding preauthorization requirements, and/or the like. The service provider computer 106 may be configured to mine and store pertinent information from any healthcare transactions and/or claims received and/or generated by the service provider computer 106, particularly data that may utilized by example embodiments described herein to estimate cost ranges of prescriptions.

The database 102 may further include alternative treatment tables that include, without limitation, product identifiers (e.g., national drug code (NDC)), a medication name, a therapeutic class (e.g., RxNorm), or other drug classification, and/or the like. The RxNorm may provide a normalized naming system for generic and branded drugs such that products having the same RxNorm, or therapeutic class, may be considered as formulary alternatives for one another.

In one implementation, each of the alternative treatment tables may be set up at a pharmacy chain/group level based upon data received at least from the pharmacy computers 110. For example, a first alternative treatment table may correspond to a pharmacy chain X, a second alternative treatment table may correspond to a pharmacy chain Y, a third alternative treatment table may correspond to a pharmacy chain Z, etc. Each alternative treatment table may, in one implementation, include claim data received from one or more pharmacy computers associated with each of the pharmacy chains (e.g., pharmacy computer 110). The claim data received from the pharmacy computer may be organized in the one or more alternative treatment tables by RxNorm (e.g., identifying a therapeutic class) and may include, without limitation, one or more product identifiers (e.g., NDC number). In certain embodiments, the alternative treatment tables may include historical data providing an average drug cost (e.g., usual and customary cost) corresponding to each product identifier. Accordingly, accessing the one or more alternative treatment tables may provide information corresponding to a lowest drug cost for multiple products (e.g., NDCs) within a same RxNorm based the upon claim data (e.g., historical claim data) received from the pharmacy computer and stored in database 102. While each of the alternative treatment tables is described as corresponding to a pharmacy chain, it is to be appreciated that the alternative treatment tables may be set up at another group level (e.g., a vendor group level, etc.). Alternative treatment tables are described in further detail in U.S. patent application Ser. No. 15/085,166, filed Mar. 30, 2016, which is hereby incorporated by reference in its entirety.

Accordingly, in addition to and/or instead of providing pricing information related to patient pay amount under a prescription benefit plan and/or cash price, example embodiments may provide alternative formularies and pricing information corresponding thereto, such as under a prescription benefit plan and/or cash discount system.

The service provider computer 106 may transmit responses regarding the prescription inquires to the client device 105 (optionally via the pharmacy computer 110). For example, the service provider computer 106 may notify the pharmacy computer 110 and/or client device 105 of and/or provide a response related to a prescription inquiry from the claims processor computer 108, such as the amount the patient should expect to pay for the prescription at a given pharmacy under a benefit plan, a cash discount system, and/or the like. A response may additionally be provided regarding formulary alternatives.

The example system of FIG. 1 described above is provided merely as an example and it will be appreciated that the example embodiments provided herein may be implemented as or employed by any number of system architectures. Some modifications may be made to certain embodiments. It will be further appreciated that any of the components of FIG. 1 are configured to communicate over a network, or network(s), as described in further detail herein.

Referring now to FIG. 2, apparatus 200 is a computing device(s) configured for implementing a prescriber computer 104, client device 105, service provider computer 106, pharmacy computer 110, and/or claims processor computer 108, according to example embodiments.

Apparatus 200 may at least partially or wholly embody any of the prescriber computer 104, client device 105, service provider computer 106, pharmacy computer 110, and/or claims processor computer 108. Apparatus 200 may therefore implement any of the prescriber computer 104, client device 105, service provider computer 106, pharmacy computer 110, and/or claims processor computer 108, in accordance with some example embodiments, or may be implemented as a distributed system that includes any of the prescriber computer 104, client device 105, service provider computer 106, pharmacy computer 110, claims processor computer 108, and/or associated network(s).

It should be noted that the components, devices, and elements illustrated in and described with respect to FIG. 2 may not be mandatory and thus some may be omitted in certain embodiments. For example, FIG. 2 illustrates a user interface 216, as described in more detail below, which may be optional in any of the prescriber computer 104, service provider computer 106, pharmacy computer 110, and/or claims processor computer 108. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210, such as that included in any of the prescriber computer 104, client device 105, service provider computer 106, pharmacy computer 110, claims processor computer 108, and/or apparatus 200 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as prescriber computer 104, client device 105, service provider computer 106, pharmacy computer 110, claims processor computer 108, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, when apparatus 200 is implemented as service provider computer 106, memory 214 may be configured to store computer program code for performing corresponding functions thereof, as described herein according to example embodiments.

Still further, memory 214 may be configured to store routing tables, that facilitate determining the destination of communications received from a prescriber computer 104, and/or claims processor computer 108. Memory 214 may further include reconciliation tables for tracking the prescription benefit coverage inquiries received from the prescriber computer 104, and reconciling them with responses received from claims processor computer 108. The memory 214 may be modified as described herein, to store reformatted prescription benefit coverage inquiries with additional information received, determined and/or generated according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases, such as database 102, that may store a variety of files, contents, or data sets, such as but not limited to historical data and alternative treatment tables. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. As such, in embodiments in which apparatus 200 is implemented as the client device 105, the user interface 216 may, in some example embodiments, provide means for user entry of insurance information, patient information, details relating to a prescription, and/or the like, and for provision of information relating to the cost of a prescription and/or alternative therapies, as described in further detail below. In some embodiments, a user interface 216 may be present in the prescriber computer 104 and/or pharmacy computer 110, such as for a user thereof to enter prescription requests and/or prescription transaction details. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst any of prescriber computer 104, client device 105, service provider computer 106, pharmacy computer 110, claims processor computer 108, and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods.

The network, such as the network in which the system of FIG. 1 or components thereof or components described herein may operate, (e.g., prescriber computer 104, client device 105, service provider computer 106, pharmacy computer 110, claims processor computer 108, and/or apparatus 200, and/or the like) may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

Having now described an example apparatus for implementing example embodiments, FIG. 3 is a flowchart illustrating example operations of an apparatus 200, according to some example embodiments. The operations of FIG. 3 may be performed by apparatus 200, such as with the service provider computer 106 and/or the like.

As shown by operation 300, apparatus 200 may include means, such as processor 212, memory 214, user interface 216, communication interface 218, and/or the like, for receiving, by one or more service provider computers comprising one or more processors, and from a client device, a prescription inquiry associated with a patient, a pharmacy, and a medication. In this regard, a user may utilize a client device 105 to access a service of a pharmacy computer 110 and/or service provider computer 106. For example, a user may access a website and/or app of the pharmacy computer 110 and/or service provider computer 106. If accessing a website and/or app of the pharmacy computer 110, such a service may further engage the service provider computer 106 such that in any event, the prescription inquiry received with regard to operation 300 is received by the service provider computer 106. In instances the pharmacy computer 110 provides an interfacing service, the data described with respect to operation 302 may be forwarded and/or routed to the service provider computer 106 over communication interface 218. Regardless of the implementation, the prescription inquiry may be additionally or alternatively referred to as a patient-initiated prescription inquiry.

In any event, a user may be registered with, and/or may be prompted to register with a service of the pharmacy computer 110 and/or service provider computer 106, and/or enter personal information via the user interface 216 such that personal identifying information may be submitted in or with the prescription inquiry. For example, the user's personal information, such as that described in further detail below, may be entered by the user or accessed, such as in database 102, via a logon procedure. The personal information of the user may be included in or appended to the prescription inquiry received by the service provider computer 106 with respect to operation 300.

In an example in which the user accesses a website or app of the pharmacy computer 110, the pharmacy computer 110 may invoke an application programming interface (API) made available to a plurality of pharmacy computers 110 in data communication with the service provider computer 106. In this regard, if the prescription inquiry is routed via a pharmacy computer 110, the request may comprise an indicator as to with which pharmacy the prescription inquiry is associated. Accordingly, references to a client device 105 may be interchangeable with pharmacy computer 110. In such scenarios in which prescription inquiries are submitted to the service provider computer 106 via a pharmacy computer 110, a user device may be in communication with the pharmacy computer 110 (which may in some examples operate as the client device 105) to access the services of the service provider computer 106.

As another example, if a user accesses an interface provided by the service provider computer 106, the user may select and/or enter their preferred pharmacy such as via a user interface. In some scenarios, currently or recently prescribed medications may be displayed to the user on user interface 216. For example, if a user affiliated with a prescriber computer 104 submitted an electronic prescription to service provider computer 106, pharmacy computer 110 and/or claims processor computer 108, details of the prescription, including the medication may be presented to the user. In certain examples, previously prescribed and optionally purchased prescriptions may be presented. In some scenarios, multiple medications prescribed to the user may be presented, and the user may select a medication for which the user is submitting a prescription inquiry, such as to obtain pricing information.

In certain examples, additionally or alternatively to presenting the user with prescribed medications for selection, a user may search for and/or freely enter a prescription medication. For example, the user may enter an NDC or medication name. Many variations may be considered for a user to indicate and/or select a medication as a subject medication of the prescription inquiry.

The prescription inquiry, including the information described above, may be transmitted via a communication interface 218 (and optionally via a pharmacy computer 110) to the service provider computer 106. The prescription inquiry received by the service provider computer 106 may further include any other information regarding a medication and/or treatment that the prescriber intends to prescribe to the patient, and/or a medication on which the patient is inquiring. The prescription inquiry may comprise a variety of other information, such as, but not limited to: patient demographic information, such as name, date of birth, age, and/or address, insurance/coverage information such as cardholder name, cardholder ID, member ID and/or other identifier, bank identification number (BIN), group ID and/or group Information, prescriber information such as Primary Care Provider ID or other identifier (e.g. NPI code), Primary Care Provider Name, Prescriber ID or other identifier (e.g. NPI code, DEA number), patient's Preferred Pharmacy or other Healthcare Provider Information (e.g. store name, chain identifier, store address, etc.), various claim information such as drug, service, or product information (e.g. via NDC number), Prescription/Service Reference Number, Date Prescription Written, Diagnosis/Condition, Number of Refills Authorized, and/or the like.

According to certain embodiments, the service provider computer 106 may receive a plurality of prescription inquiries, such as from one or more client devices 105 and/or pharmacy computers 110, on a continual and/or ongoing basis and may process such requests as described in further detail herein, in real-time or near real-time. The term "near" real-time is used to express that the prescription inquiry may be processed, and the pricing information, described in further detail below, may be desired within a fraction of a second, or seconds, from the time the prescription inquiry is submitted, to account for computer processing delays.

In operation 302, apparatus 200 may include means, such as processor 212, memory 214, and/or the like, for generating a cash price inquiry, a formulary alternative inquiry, and a prescription benefit inquiry based on the prescription inquiry. Each of the cash price inquiry, a formulary alternative inquiry, and a prescription benefit inquiry may be in a different format that the prescription inquiry, and may in different formats from each other.

According to certain embodiments, the cash price inquiry may be generated by a cash price inquiry module of the service provider computer 106. The cash price inquiry may be generated in accordance with an application programming interface (API) of a cash price inquiry module, for example. According to certain embodiments, the cash price inquiry may be a specialized data object configured for obtaining cash prices and/or cash price estimates of certain medication, and may comprise any of the data needed from the prescription inquiry to obtain the cash price and/or cash price estimate, such as but not limited to the medication (e.g., NDC), pharmacy at which the medication is to be obtained, and/or the like. The cash price inquiry (e.g., the cash price inquiry data object) may therefore be generated and stored on memory 214 for further processing as described below with respect to operation 310.

According to certain embodiments, the alternative formulary inquiry may be generated by an alternative formulary inquiry module of the service provider computer 106. The alternative formulary inquiry may be generated in accordance with an application programming interface (API) of an alternative formulary inquiry module, for example. In some embodiments, the alternative formulary inquiry may be a specialized data object configured for obtaining formulary alternatives (and/or corresponding pricing information), and may comprise any data needed from the prescription inquiry to determine formulary alternatives (and/or corresponding pricing information), such as but not limited to the medication (e.g., NDC), pharmacy at which the medication is to be obtained, and/or the like. The formulary alternative inquiry (e.g., the formulary alternative data object) may therefore be generated and stored on memory 214 for further processing as described below with respect to operation 312.

The prescription benefit inquiry may be a specialized data object configured for obtaining patient pay amounts under a prescription benefit plan. In some examples, the prescription benefit inquiry may be in accordance with one or more predefined and/or standardized formats, such as the National Council for Prescription Drug Programs (NCPDP), and/or the like. The prescription benefit inquiry may include any information from the prescription inquiry, such as those required by NCPDP and/or other standardized format, such as but not limited to any information in the prescription inquiry. The prescription benefit inquiry may include more data fields in comparison to the cash price inquiry. For example, the prescription benefit inquiry may include, in addition to the NDC or other medication identifying information, numerous other data related to the prescription benefit plan, such as a member ID, group ID, BIN, and/or other data fields described with respect to operation 300.

In operation 304, apparatus 200 may include means, such as processor 212, memory 214, and/or the like, for determining a claims processor computer 108 to which to transmit the prescription benefit inquiry. In this regard, the processor 212 may access routing tables stored on memory 214 (such as database 102) to determine a network address and/or other information enabling data communication with a claims processor computer 108 associated with the user's, or patient's, prescription benefit plan. Any of the insurance information included in prescription inquiry, such as but not limited to a BIN, member ID, cardholder ID and/or other identifier, group ID and/or group information may be utilized to determine which claims processor computer, potentially from a plurality of claims processor computers to which transmit and/or route the prescription benefit inquiry.

In operation 306, apparatus 200 may include means, such as processor 212, memory 214, communication interface 218, and/or the like, for transmitting the prescription benefit coverage inquiry to the pharmacy claims processor computer. In certain embodiments, the claims processor computer 108 may be operated separately from the service provider computer 106, and may adjudicate or otherwise process prescription benefit coverage inquiries received from various sources, such as but not limited to the service provider computer 106. In some embodiments, the adjudication may comprise a determination of whether the medication associated with the prescription benefit coverage inquiry is covered by the patient's insurance and may provide additional medication cost information relevant to the patient and/or prescriber.

As shown by operation 308, apparatus 200 may include means, such as processor 212, memory 214, communication interface 218, and/or the like, for monitoring a network for receipt of a prescription benefit coverage response associated with the prescription benefit coverage inquiry from the claims processor computer. As the service provider computer 106 may function a switch in data communication with a plurality of claims processor computers 108 (and plurality of prescriber computers 104, pharmacy computers 110, and client devices 105), the service provider computer 106 may receive numerous responses, on an ongoing basis, over the network and communication interface 218. Accordingly, when such responses are received, example embodiments, such as processor 212, access one or more reconciliation tables and/or other data stored that enables the processor 212 to reconcile responses with their corresponding requests (e.g., prescription inquiries). Accordingly, the data provided in the prescription benefit coverage response associated with the prescription benefit coverage inquiry generated in operation 302, and transmitted in operation 306, is further processed with regard to operation 320, described below. In certain scenarios, if a timeout with no response associated with the inquiry is received in a certain predetermined period of time (e.g., 2 seconds), a prescription inquiry response may be generated and/or stored indicating no response from the claims processor was received. Alternative operations may be performed in such examples, such as calculating price estimates according to historical prices paid under the benefit plan.

Operations 310 and 312 in FIG. 3 are shown adjacent to operation 304, because in certain embodiments, operations 304, 310, and/or 312 may occur simultaneously, or in any order, without dependency on each other. Accordingly, different sub-processes, modules, and/or circuitry of the service provider computer 106 may perform operations 304, 310, and 312 (and optionally, the respective operations leading therefrom). In embodiments in which the service provider computer 106 is implemented as a distributed system, any of the operations 304, 310, and/or 312 (and optionally, the respective operations leading therefrom) may be performed by different computing devices. Numerous variations may be contemplated.

In an event, in operation 310, may apparatus 200 include means, such as processor 212, memory 214, and/or the like, for executing the cash price inquiry to receive a cash price response. In certain embodiments, executing the cash price inquiry may be performed by the cash price inquiry module of the service provider computer 106 and/or invoking an associated API. Executing the cash price inquiry may include executing certain computer program code configured to access historical cash prices and/or cash transaction history associated with the pharmacy to estimate a cash price for the prescribed medication at the pharmacy indicated in the prescription inquiry. Example embodiments may access the historical data, such as from the database 102. According to certain example embodiments, the service provider computer 106 may store and utilize historical data, such as historical cash prices from prior prescription transactions that were transmitted from the pharmacy computer 110 to the service provider computer 106. For example, the pharmacy computer 110 may work in agreement with the service provider computer 106 to provide the data regarding cash purchases made at the pharmacy. In this regard, example embodiments may query the database 102 to determine a cash discount system that provides the lowest patient pay amount for the prescription, in comparison to other cash discount systems. A BIN or other identifying information of a cash discount system may be included in the response. The particular cash discount system indicated in the cash price response may be identified from a plurality of cash discount systems.

In certain embodiments, historical information may be stored in database 102 in association with a particular pharmacy and/or pharmacy chain, and/or state. For example, various evaluation systems 108 (e.g., cash discount systems) may provide pricing of certain drugs for sale by a particular pharmacy and/or pharmacy chain within a certain state. Accordingly, the historical data evaluated may be specifically associated with the pharmacy and/or pharmacy chain indicated in the prescription inquiry. Additionally or alternatively, historical information evaluated may be limited to a particular time frame, such as the prior 2 weeks or prior one month. This may ensure that more recent data is evaluated to increase the chances of the historical data still being applicable to current transactions. Further detail regarding cash price inquiries and the potential cash price responses is provided in U.S. patent application Ser. No. 16/867,286, filed May 5, 2020, which is hereby incorporated by reference in its entirety.

In any event, the service provider computer 106 may maintain the historical information and evaluate the historical data, to determine the best cash price for the patient, and generate the cash price response such that the cash price response includes the price and associated cash discount system. In certain examples, as discussed in further detail with regard to operation 320 below, additional information may be evaluated in the cash price response, such as the pharmacy economic information. The pharmacy economic information, or revenue, may be utilized to determine if the cash price response should be provided to the patient.

In operation 312, apparatus 200 may include means, such as processor 212, memory 214, and/or the like, for executing the alternative formulary inquiry to receive an alternative formulary response. In certain embodiments, executing the alternative formulary inquiry may be performed by the alternative formulary inquiry module of the service provider computer 106. Example embodiments, such as processor 212, may query the one or more alternative treatment tables, such as those stored on database 102, to determine whether an alternative treatment and/or alternative product equivalent for the medication is available. In certain embodiments, the query may be based upon the pharmacy, or service provider identifier, indicated in the prescription inquiry. In one implementation, example embodiments may search for an alternative treatment table corresponding to the pharmacy name field in the prescription inquiry, populated with a short pharmacy name. The apparatus 200 may query the identified alternative treatment table for the RxNorm and/or NDC identified in the prescription inquiry and/or associated therewith. In certain examples, the query may include further search parameters or filtering, based on patient payment threshold, usual and customary costs, and/or the like, as described in further detail in patent application Ser. No. 15/085,166.

As an example, for Lisinopril, a medication belonging to a therapeutic class of ACE inhibitors, example embodiments may search for an alternative ACE inhibitor. In some examples, historical cost data may be accessed in the alternative treatment table while executing the formulary alternative inquiry. As another example, executing the formulary alternative inquiry may include accessing and/or comparing historical data for the alternative drug and/or average cost of a drug (e.g., a usual and customary cost). For example, example embodiments may determine that an alternative ACE inhibitor Benazepril has the lowest average drug cost for the specific pharmacy chain/group, and such information may be incorporated in the alternative formulary response. As another example, pricing information of an alternative formulary may be evaluated in operation 320, such as in comparison to cash prices and/or patient pay amounts for the medication If no alternative treatment is identified, the alternative formulary response may include an indicator or message that no alternative formulary is identified.

In certain embodiments, if the alternative formulary response identifies an alternative formulary, example embodiments may perform certain aspects of operations 302, 304, 306, 308, and 310. In this regard, executing the formulary inquiry comprises generating at least one additional prescription benefit inquiry and an additional cash price inquiry based on the alternative formulary response For example, if Benazepril is identified as a formulary alternative to Lisinopril, in addition to or instead of using pricing information from the alternative therapy tables and/or historical prices, example embodiments may generate a prescription benefit inquiry and transmit the prescription benefit inquiry to the pharmacy claims processor in an attempt to obtain a patient pay amount, under the plan, for the alternative therapy Benazepril. Any such responses from the claims processor (such as those that may be received with respect to operation 308), may be further processed according to operation 320 described below. Additionally or alternatively, a cash price inquiry may be generated and executed according to operations 302 and 310. Any such cash price responses may be further processed according to operation 320 described below.

Accordingly, numerous variations may be implemented to obtain pricing information relating to an alternative formulary response, and the pricing information may be incorporated in the alternative formulary response and/or obtained in response to receiving the alternative formulary response (with reference to any of operations 302, 304, 306, 308, and/or 310).

In operation 320, apparatus 200 may include means, such as processor 212, memory 214, and/or the like, for generating a prescription inquiry response including at least data from the prescription benefit coverage response, the cash price response, and the alternative formulary response. In this regard, in certain examples, a single response may be generated that includes any and/or all of the relevant pricing information to be returned to the patient via the client device 105. As used herein herein, the prescription inquiry response may be additionally or alternatively referred to as a consolidated prescription inquiry response. For example, the prescription inquiry response may compile and/or consolidate data relating to the patient pay amount returned by the claims processor computer 108, a cash price obtained in the cash price response, and/or a formulary alternative and associated pricing. The prescription inquiry response may therefore be in a different format than any of the prescription benefit coverage inquiry, the cash price response and/or the alternative formulary response, because the prescription inquiry response is configured to incorporate data from any or all of the prescription benefit coverage inquiry, the cash price response and/or the alternative formulary response. The prescription inquiry response may, however, be in a predefined format defined by the service provider computer 106, such that the prescription inquiry response may be processed and displayed by a client device as described in further detail below. In this regard, a prescription benefit coverage response, a cash price response, and a alternative formulary response may be reformatted into a prescription inquiry response (e.g., single prescription inquiry response).

Many variations for incorporating pricing information in the prescription inquiry response may be implemented. For example, a cash price included in the cash price response may be further analyzed and/or compared to a patient pay amount under a benefit plan (received in a prescription benefit coverage response). As an example, if the cash price is higher than or equal to the patient pay amount under the benefit plan, the system may determine to exclude the cash price from the prescription inquiry response, because submitting the prescription purchase under the benefit plan would be more advantageous for the patient than paying cash, because the cost would be applied towards a plan deductible.

In some embodiments, the pharmacy economic information related to a cash price may also be considered, such that pharmacy revenue, less any administrative fees owed to the cash discount system, is taken into account. In certain embodiments, the prescription inquiry response may only include the cash price response if the pharmacy economic information reflects better (and/or equal) pharmacy economic information (e.g., higher and/or equal revenue), in comparison to revenue received if the patient purchases the medication through their benefit plan. Numerous variations and/or further analysis for inclusion of pricing information may be contemplated.

In certain scenarios of missing and/or erroneous data, such as one in which a prescription benefit coverage response is not received from the claims processor, alternative operations may be performed, such as obtaining price estimates based on historical data. Additionally or alternatively, a message may be inserted indicating certain price checks are inconclusive or unavailable.

In operation 322, apparatus 200 may include means, such as processor 212, memory 214, communication interface 218, and/or the like, for transmitting the prescription inquiry response to the client device associated with the prescription inquiry. In certain embodiments, the prescription inquiry response may be returned to a client device such as the client device 105 (such as a user device) and/or the pharmacy computer 110, such as in embodiments in which the patient accesses services of the service provider computer 106 indirectly via a pharmacy computer 110.

In operation 324 apparatus 200 may include means, such as processor 212, memory 214, user interface 216, communication interface 218, and/or the like, for causing display of the prescription inquiry response via the client device. The prescription inquiry response transmitted to the client device may further include computer program instructions that when executed, cause the prescription inquiry response and/or data therein (e.g., pricing information from the prescription benefit coverage response, the cash price response, and/or the alternative formulary response) to be displayed to the client device, such as to a patient who entered the prescription inquiry via a website and/or mobile app. In this regard, the pricing information, such as but not limited to the cash price, patient pay amount under a benefit plan, and/or alternative formulary and corresponding costs, may be displayed to the patient in real-time or near real-time relative to having submitted the prescription inquiry.

In certain embodiments, options for transmitting messages associated with the prescription inquiry and/or prescription inquiry response may be provided to the patient, such as via the client device 105. In this regard, service provider computer 106 may provide an option for user engagement to initiate transmission of a message to at least one of a pharmacy computer or prescriber computer regarding the prescription inquiry. For example, information displayed as apart of or with the prescription inquiry response may enable the patient or user to make a selection to send an inquiry to the pharmacy computer 110 to request engagement with a prescriber to submit and/or change a prescription, for example. Additionally or alternatively to initiating a communication to the pharmacy computer 110, the patient and/or user may contact the prescriber computer 104 to request a prescriber to submit and/or change a prescription. In this regard the patient can initiate the start of a new medication and/or switch to a different medication such as a formulary alternative.

As yet another example, a patient or user may utilize the user interface provided by the service provider 106, and client device 105, to select a cash discount system with which to purchase a prescription and/or to indicate the benefit plan will be used to submit a prescription claim. Numerous variations and outcomes may be contemplated. For example, the user may be prompted to provide registration information to register with a selected cash discount system, and/or the pharmacy computer 110 may receive an indication of selection of a cash discount system by the user to be used to process a prescription transaction.

Example embodiments, such as those including but not limited to those performing operations described above, may therefore provide technical improvements over service provider systems. In many instances, patients do not have access to patient pay amounts through benefit plans, that can otherwise be obtained only via submitting an electronic request, such as those in accordance with NCPDP, for example, by service provider computer 106 or other authorized interfacing systems to the claims processor computer 108. Additionally, patients often do not have access to or knowledge of cash discount systems and/or nor alternative therapies. For example, a patient that knows of cash discount systems may not know of every cash discount system available in order to access their separate services and obtain pricing information. In certain examples, some patients may not be aware of the concept of alternative therapies, may not even think to research alternative therapies, nor have access to such information that may otherwise only be available via systems authorized to access the claims processor computer 108 and/or pharmacy computer 110. In this regard, according to example embodiments provided herein, the user or patient need only access a service (possibly a single service) provided by the service provider computer 106 or improved service provider computer 106 (optionally via a pharmacy computer 110) to submit a prescription inquiry, and example embodiments automatically generate the various inquiries, in different formats and for different sources, to obtain the pricing information described herein. This automatic generation and execution and/or transmission of different inquiries, or transactions, provides a practical application of example embodiments, by way of the improved service provider computer.

Indeed, existing service provider systems that operate as a switch, router, and/or processor of different types of prescription transactions may be leveraged and improved upon, buy utilizing the data and available sources to provide the pricing information to patients in real-time or near real-time as the prescription inquiry is submitted by the patient. This provides prescription pricing transparency to patients, and therefore increases and/or improves prescription adherence.

As one example of improved adherence, a patient can initiate a pricing inquiry independently of any transaction occurring at a pharmacy needing verification and/or submission by a pharmacist, and may further initiate a communication and/or request to have their prescription changed. This may improve the patient's economic position, rather than experiencing price-shock at the pharmacy when attempting to purchase a prescription but possibly abandoning the prescription due to cost. Accordingly, the improved service provider system disclosed herein may improve prescription adherence.

In such systems, processing resources, such as memory and/or processing power may be conserved by consolidating pricing information in a pricing inquiry response. For example, a user, if a user has access to such systems, would not need to access various systems associated with a claims processor computer 108, cash discount system, and/or the like, because the service provider computer 106 facilitates inquiries of such systems and/or pricing information accordingly. Similarly, the access to the alternative formularies by the service provider computer 106 provides a more efficient method in comparison to a user performing ad-hoc searches for medications by therapeutic class.

Example embodiments provide technical improvements to such systems by implementing the apparatus 200 such that the pricing information is provided to the patient in real-time or near real-time as the physician prescribes a medication for a patient. The term "near" real-time is used to express that a cost estimate may be provided at the prescriber computer 104 within a fraction of a second, or seconds, from the time the prescription benefit coverage inquiry is submitted. The technical challenges in providing this real-time feedback are increased by the evolving complexities of healthcare transactions and their associated processing by claims processing computers 108, and the uncertainty or inconsistency of response quality and response time associated therewith. The challenges are further increased by the ever increasing volume of data received from pharmacies and/or claims processors. Example embodiments leverage the historical data in a manner described herein that provides efficient, and accurate cost estimates for patients and physicians at the point of service.

The solutions provided by example embodiments therefore improve the usage of processing resources, and additionally or alternatively improve the functioning of the service provider computer 106 by reducing and/or eliminating erroneous responses and reducing and/or eliminating instances in which patients are left without cost information when responses are not provided by a claims processor computer 108.

Similarly, example embodiments may reduce and/or eliminate the need for prescription inquiry resubmissions, and/or the like, caused by users such as prescribers not understanding why a response was not received, and resubmitting identical prescription benefit coverage inquiries in hopes of receiving a proper response. Having various sources of prescription pricing information may increase the probability that a valid price and/or price estimate is returned, therefore reducing or limiting the need for resubmission of inquiries. This may therefore reduce the resources expended, such as memory and/or processing power, that may otherwise be required to facilitate the resubmission (and possibly numerous resubmissions) of the same or similar prescription inquiries, as well as the associated rerouting, and reprocessing of the resubmitted transaction(s) throughout the various components described herein. Likewise, example embodiments may reduce processing resources otherwise expensed on extensive research, custom queries, and/or the like, when cost estimates for prescriptions cannot otherwise be obtained. Accordingly, example embodiments described herein further improve the technical efficiency of systems implementing and/or employing such embodiments.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIG. 3 illustrates operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

The invention claimed is:

1. An apparatus comprising one or more processors and at least one memory including computer program code that when executed by the one or more processors, causes the one or more processors to perform:
   storing, in a database, (a) a time threshold, (b) a history of prescription transactions comprising respective medications, prices, and (c) and one or more alternative treatment tables;
   receiving from a client device, a prescription inquiry associated with a patient, a pharmacy, and a medication;
   generating a cash price inquiry, a prescription benefit coverage inquiry, and a formulary alternative inquiry based on the prescription inquiry;
   determining a claims processor computer to which to transmit the prescription benefit coverage inquiry;
   transmitting the prescription benefit coverage inquiry to a pharmacy claims processor computer;
   monitoring a communication network for receipt of a prescription benefit coverage response associated with the prescription benefit coverage inquiry from the claims processor computer;
   determining whether a response from the pharmacy claims processor computer is received within the time threshold;
   based on a determination that the response from the pharmacy claims processor computer is received within the time threshold, generating a prescription inquiry response comprising the response from the pharmacy claims processor computer;
   based on a determination that the response from the pharmacy claims processor computer is not received within the time threshold, and further based on the stored history of prescription transactions, generating a prescription inquiry response that includes an estimated cost range for the medication;
   executing the cash price inquiry, wherein executing the cash price inquiry comprises obtaining a cash price response from the database;
   executing the formulary alternative inquiry, wherein executing the formulary alternative inquiry comprises obtaining an alternative formulary response from the database;
   inserting into the prescription inquiry response, the cash price response, and the alternative formulary response; and
   transmitting the prescription inquiry response to the client device associated with the prescription inquiry.

2. The apparatus according to claim 1, wherein executing the formulary alternative inquiry comprises generating at least one additional prescription benefit coverage inquiry and an additional cash price inquiry based on the alternative formulary response.

3. The apparatus according to claim 1, wherein the computer program code, when executed by the one of more processors, further causes the one or more processors to perform:
   receiving an indication of initiation of transmission of a message to at least one of a pharmacy computer or prescriber computer regarding the prescription inquiry.

4. The apparatus according to claim 1, wherein the cash price inquiry, the prescription benefit coverage inquiry, and the formulary alternative inquiry are in different formats that the prescription inquiry.

5. A computer program product comprising at least one non-transitory computer-readable storage medium having computer-executable program code instructions stored therein that when executed by one or more processors, cause the one or more processors to perform:
   storing, in a database, (a) a time threshold, (b) a history of prescription transactions comprising respective medications, prices, and (c) and one or more alternative treatment tables;
   receiving, via a communications interface of a service provider computer, and from a client device, a prescription inquiry associated with a patient, a pharmacy, and a medication;
   generating a cash price inquiry, a prescription benefit coverage inquiry, and a formulary alternative inquiry based on the prescription inquiry;
   determining a claims processor computer to which to transmit the prescription benefit coverage inquiry;
   transmitting the prescription benefit coverage inquiry to a pharmacy claims processor computer;
   monitoring a communication network for receipt of a prescription benefit coverage response associated with the prescription benefit coverage inquiry from the claims processor computer;
   determining whether a response from the pharmacy claims processor computer is received within the time threshold;
   based on a determination that the response from the pharmacy claims processor computer is received within the time threshold, generating a prescription inquiry response comprising the response from the pharmacy claims processor computer;
   based on a determination that the response from the pharmacy claims processor computer is not received within the time threshold, and further based on the stored history of prescription transactions, generating a prescription inquiry response that includes an estimated cost range for the medication;
   executing the cash price inquiry, wherein executing the cash price inquiry comprises obtaining a cash price response from the database;
   executing the formulary alternative inquiry, wherein executing the formulary alternative inquiry comprises obtaining an alternative formulary response from the database;
   inserting into the prescription inquiry response, the cash price response, and the alternative formulary response; and
   transmitting the prescription inquiry response to the client device associated with the prescription inquiry.

6. The computer program product according to claim 5, wherein executing the formulary alternative inquiry comprises generating at least one additional prescription benefit coverage inquiry and an additional cash price inquiry based on the alternative formulary response.

7. The computer program product according to claim 5, wherein the computer-executable program code instructions, when executed by the one or more processors, cause the one or more processors to perform:
   receiving an indication of initiation of transmission of a message to at least one of a pharmacy computer or prescriber computer regarding the prescription inquiry.

8. The computer program product according to claim 5, wherein the cash price inquiry, the prescription benefit coverage inquiry, and the formulary alternative inquiry are in different formats that the prescription inquiry.

* * * * *